US010439777B2

(12) United States Patent
Wernersson et al.

(10) Patent No.: US 10,439,777 B2
(45) Date of Patent: Oct. 8, 2019

(54) DETERMINING TRANSMISSION PARAMETERS FOR DOWNLINK COMMUNICATION CHANNELS

(71) Applicant: Telefonaktiebolaget LM Ericsson (publ), Stockholm (SE)

(72) Inventors: Niklas Wernersson, Kungsängen (SE); Gustav Wikström, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 20 days.

(21) Appl. No.: 15/580,405

(22) PCT Filed: Nov. 2, 2017

(86) PCT No.: PCT/EP2017/078062
§ 371 (c)(1),
(2) Date: Dec. 7, 2017

(87) PCT Pub. No.: WO2019/086113
PCT Pub. Date: May 9, 2019

(65) Prior Publication Data
US 2019/0132098 A1    May 2, 2019

(51) Int. Cl.
*H04W 4/00* (2018.01)
*H04L 5/00* (2006.01)
(Continued)

(52) U.S. Cl.
CPC ......... *H04L 5/0048* (2013.01); *H04B 7/0619* (2013.01); *H04B 7/0626* (2013.01);
(Continued)

(58) Field of Classification Search
CPC ... H04L 5/0048; H04B 7/0626; H04B 7/0639; H04B 7/0632; H04W 72/04
(Continued)

(56) References Cited

U.S. PATENT DOCUMENTS

2014/0018118 A1*  1/2014  Hammarwall ........ H04L 5/0057
                                                            455/501
2014/0313912 A1* 10/2014  Jongren ................ H04W 24/10
                                                            370/252
(Continued)

FOREIGN PATENT DOCUMENTS

WO    2016163842 A1    10/2016

OTHER PUBLICATIONS

CSI feedback for multi-TRP, 3GPP TSG RAN WG1 Meeting #90bis, Prague, CZ, Oct. 9-13, 2017. (From Applicant's IDS) Year: (2017).*

(Continued)

*Primary Examiner* — Mang Hang Yeung
(74) *Attorney, Agent, or Firm* — Murphy, Bilak & Homiller, PLLC

(57) ABSTRACT

Exemplary embodiments include methods and/or procedures for determining transmission parameters for downlink communication channels from one or more network nodes to one or more wireless communication devices, comprising: receiving information identifying a first data service type, of a plurality of available data service types, associated with a first wireless communication device; configuring a first plurality of antenna elements as a second plurality of channel state information (CSI) ports based on the first data service type, wherein the second plurality varies for the available data service types; and determining, based on transmission or reception using the second plurality of CSI ports, first downlink transmission parameters for the first data service. In some embodiments, the second plurality is less than the first plurality for a particular data service type. Exemplary embodiments also include network nodes configured to perform, and computer-readable media compris- (Continued)

ing instructions embodying, operations of the exemplary methods and/or procedures.

22 Claims, 14 Drawing Sheets

(51) Int. Cl.
*H04W 72/04* (2009.01)
*H04B 7/06* (2006.01)

(52) U.S. Cl.
CPC ......... *H04B 7/0632* (2013.01); *H04B 7/0639* (2013.01); *H04B 7/0695* (2013.01); *H04W 72/04* (2013.01)

(58) Field of Classification Search
USPC ........................................... 370/329
See application file for complete search history.

(56) References Cited

U.S. PATENT DOCUMENTS

| | | | |
|---|---|---|---|
| 2015/0195020 A1* | 7/2015 | Zhu | H04B 7/0617 370/329 |
| 2016/0149617 A1* | 5/2016 | Zhu | H04B 7/043 375/267 |
| 2018/0115357 A1 | 4/2018 | Park | |

OTHER PUBLICATIONS

CSI acquisition detail for hybrid CSI, 3GPP TSG RAN WG1 Meeting #90bis, Prague, CZ, Oct. 9-13, 2017. (From Applicant's IDS) (Year: 2017).*
"CSI acquisition details for hybrid CSI", 3GPP TSG RAN WG 1 Meeting #90bis; RI-1718243; Prague, Czech Republic, Oct. 9-13, 2017, pp. 1-5.
"CSI feedback for multi-TRP", 3GPP TSG RAN WG1 Meeting 90bis; R1-1718737; Prague, CZ, Oct. 9-13, 2017, pp. 1-9.

* cited by examiner

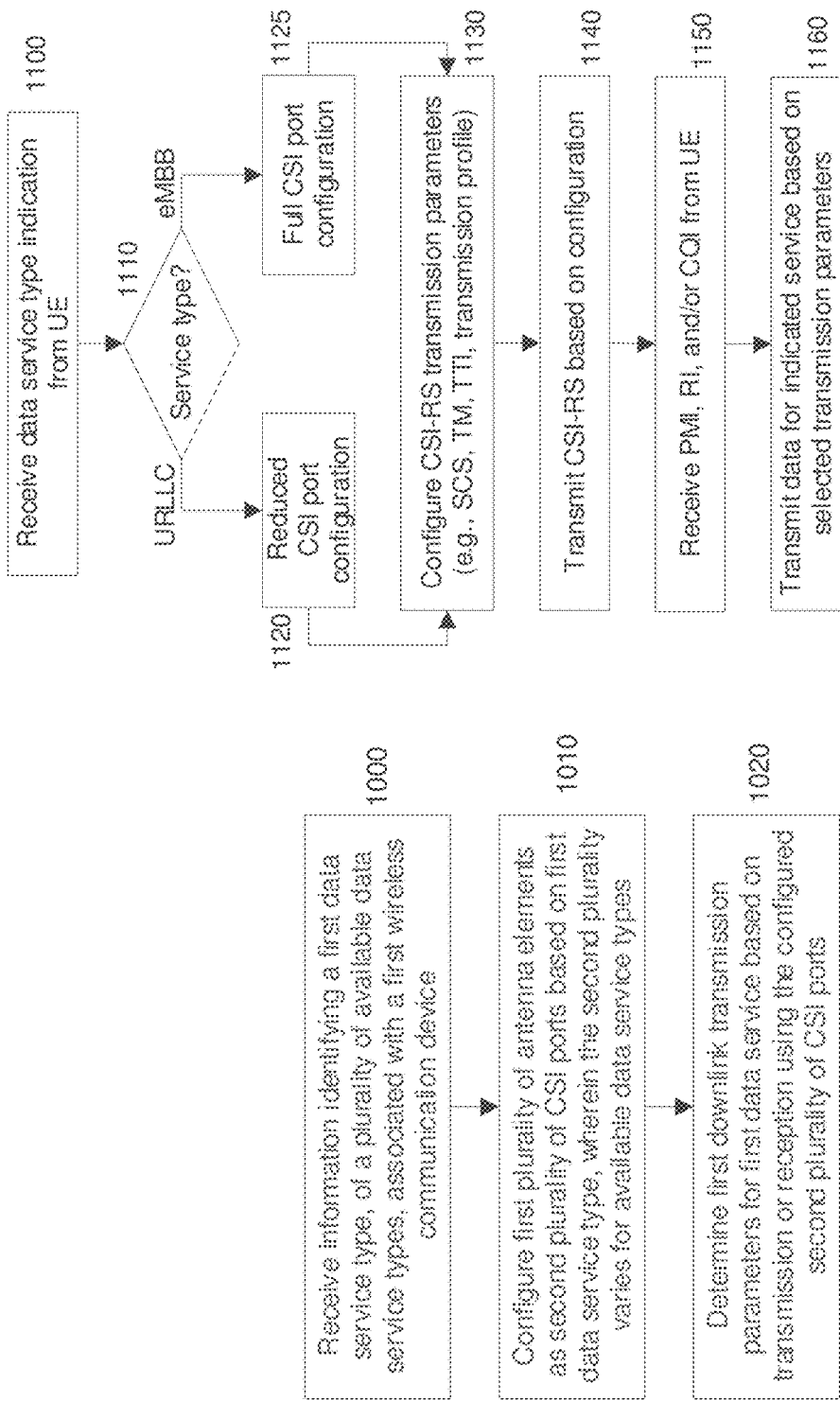

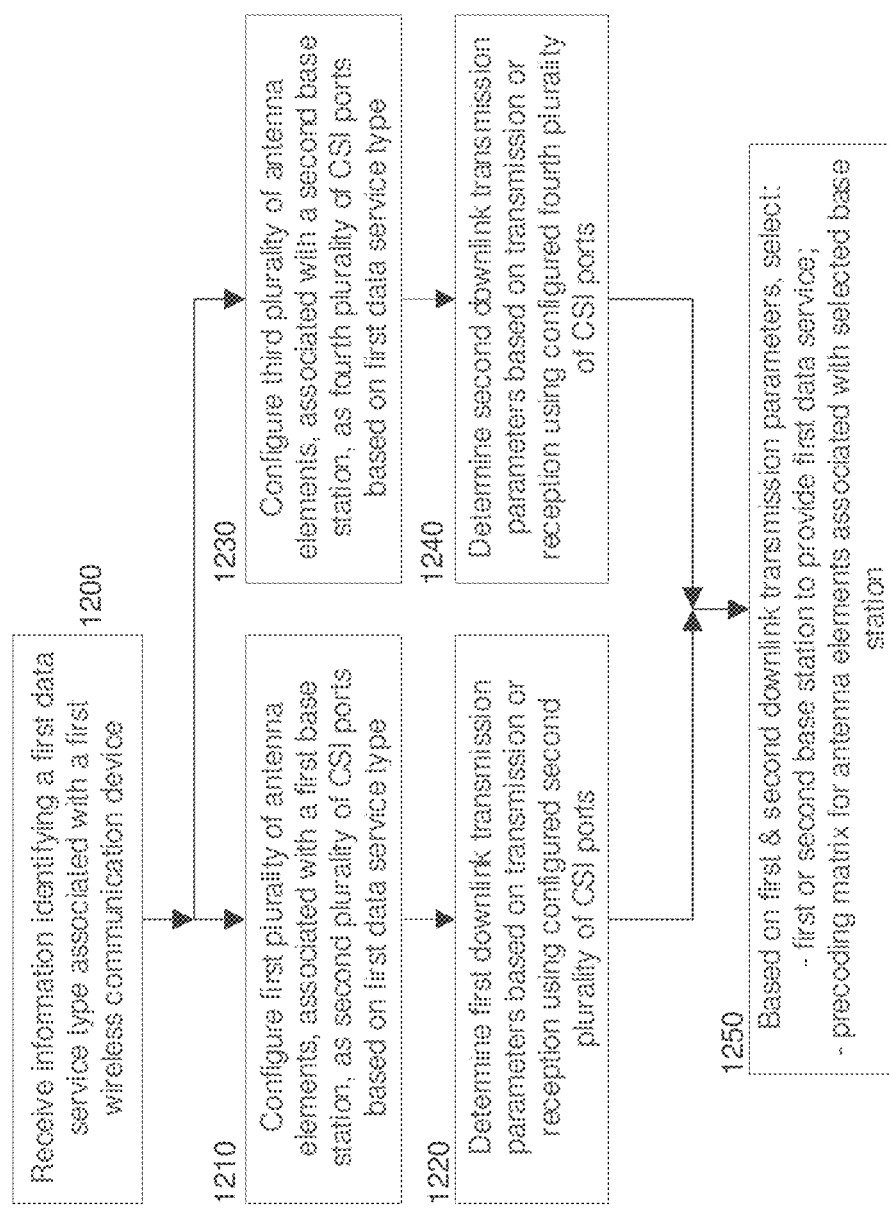

DETERMINING TRANSMISSION PARAMETERS FOR DOWNLINK COMMUNICATION CHANNELS

TECHNICAL FIELD

The present application relates generally to the field of wireless communication systems and methods, and more specifically to systems, methods, and apparatus that improve the flexibility, efficiency, latency, and throughput performance of multi-service wireless communication transmitters and/or receivers utilizing arrays of antenna elements (e.g., M-by-N antenna array, where M≥1 and N>1), including user equipment and base stations.

BACKGROUND

Wireless communication has evolved rapidly in the past decades as a demand for higher data rates and better quality of service has been continually required by a growing number of end users. Next-generation (so-called "5G") cellular systems are expected to operate at higher frequencies (e.g., millimeter-wavelength or "mmW") such as 5-300 GHz. Such systems are also expected to utilize a variety of multi-antenna technology (e.g., antenna arrays) at the transmitter, the receiver, or both. In the field of wireless communications, multi-antenna technology can comprise a plurality of antennas in combination with advanced signal processing techniques (e.g., beamforming). Multi-antenna technology can be used to improve various aspects of a communication system, including system capacity (e.g., more users per unit bandwidth per unit area), coverage (e.g., larger area for given bandwidth and number of users), and increased per-user data rate (e.g., in a given bandwidth and area). Directional antennas can also ensure better wireless links as a mobile or fixed device experiences a time-varying channel.

The availability of multiple antennas at the transmitter and/or the receiver can be utilized in different ways to achieve different goals. For example, multiple antennas at the transmitter and/or the receiver can be used to provide additional diversity against radio channel fading. To achieve such diversity, the channels experienced by the different antennas should have low mutual correlation, e.g., a sufficiently large antenna spacing ("spatial diversity") and/or different polarization directions ("polarization diversity"). Historically, the most common multi-antenna configuration has been the use of multiple antennas at the receiver side, which is commonly referred to as "receive diversity." Alternately and/or in addition, multiple antennas can be used in the transmitter to achieve transmit diversity. A multi-antenna transmitter can achieve diversity even without any knowledge of the channels between the transmitter and the receiver, so long as there is low mutual correlation between the channels of the different transmit antennas.

In various wireless communication systems, such as cellular systems, there can be fewer constraints on the complexity of the base station (also referred to herein as network node, NodeB (NB), and evolved NodeB (eNB), and next-generation NodeB (gNB)) compared to the terminal (also referred to herein as user equipment (UE), wireless communication device, and mobile unit). In such exemplary cases, a transmit diversity may be feasible in the downlink (i.e., base station to terminal) only and, in fact, may provide a way to simplify the receiver in the terminal. In the uplink (i.e., terminal to base station) direction, due to a complexity of multiple transmit antennas, it may be preferable to achieve diversity by using a single transmit antenna in the terminal multiple receive antennas at the base station. Nevertheless, it is expected that in 5G systems, certain operating configurations will utilize multiple antennas at both the terminal and the base station.

In other exemplary configurations, multiple antennas at the transmitter and/or the receiver can be used to shape or "form" the overall antenna beam (e.g., transmit and/or receive beam, respectively) in a certain way, with the general goal being to improve the received signal-to-interference-plus-noise ratio (SINR) and, ultimately, system capacity and/or coverage. This can be done, for example, by maximizing the overall antenna gain in the direction of the target receiver or transmitter or by suppressing specific dominant interfering signals. In general, beamforming can increase the signal strength at the receiver in proportion to the number of transmit antennas. Beamforming can be based either on high or low fading correlation between the antennas. High mutual antenna correlation can typically result from a small distance between antennas in an array. In such exemplary conditions, beamforming can boost the received signal strength but does not provide any diversity against radio-channel fading. On the other hand, low mutual antenna correlation typically can result from either a sufficiently large inter-antenna spacing or different polarization directions in the array. If some knowledge of the downlink channels of the different transmit antennas (e.g., the relative channel phases) is available at the transmitter, multiple transmit antennas with low mutual correlation can both provide diversity, and also shape the antenna beam in the direction of the target receiver and/or transmitter.

In other exemplary configurations, multiple antennas at both the transmitter and the receiver can further improve the SINR and/or achieve an additional diversity against lading compared to only multiple receive antennas or multiple transmit antennas. This can be useful in relatively poor channels that are limited, for example, by interference and/or noise (e.g., high user load or near cell edge). In relatively good channel conditions, however, the capacity of the channel becomes saturated such that further improving the SINR provides limited increases in capacity. In such cases, using multiple antennas at both the transmitter and the receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example, under certain exemplary conditions, the channel capacity can increase linearly with the number of antennas and avoid saturation in the data capacity and/or rates. These techniques are commonly referred to as "spatial multiplexing" or multiple-input multiple-output (MIMO) antenna processing.

In order to achieve these performance gains, MIMO generally provides that both the transmitter and receiver have knowledge of the channel from each transmit antenna to each receive antenna. In some exemplary embodiments, this can be done by the receiver measuring the amplitude and phase of a known transmitted data symbol (e.g., a pilot symbol and/or reference symbol) and sending these measurements to the transmitter as "channel state information" (CSI). CSI can include, for example, amplitude and/or phase of the channel at one or more frequencies, amplitude and/or phase of time-domain multipath components of the signal via the channel, direction of arrival of multipath components of the signal via the channel, and other direct channel measurements known by persons of ordinary skill. Alternately, or in addition, CSI can include a set of transmission parameters recommended for the channel based on one or more channel measurements.

As used herein, "multipath component" can describe any resolvable signal component arriving at a receiver or incident on an antenna array at the receiver. The multipath component can be processed by the receiver at the radio frequency (RF), after conversion to an intermediate frequency (IF), or after conversion to baseband (i.e., zero or near-zero frequency). A plurality of the multipath components can comprise a main component of a transmitted signal received via a primary, direct, or near-direct path from the transmitter to the receiver, as well as one or more secondary components of the transmitted signal received via one or more secondary paths involving reflection, diffraction, scattering, delay, attenuation, and/or phase shift of the transmitted signal. Persons of ordinary skill can recognize that the number and characteristics of the multipath components available to be processed by a receiver can depend on various factors including, e.g., transmit and receive antennas, channel and/or propagation characteristics, transmission frequencies, signal bandwidths, etc.

In the case of a transmit array comprising $N_T$ antennas and a receive array comprising $N_R$ antennas, the receiver can be used to send CSI for $N_T \cdot N_R$ channels to the transmitter. Moreover, in mobile communication environments, these $N_T \cdot N_R$ channels are likely not stationary but vary according to the relative motion between the transmitter and the receiver (e.g., base station and terminal). The rate of change of the channel—and thus the preferable CSI update rate—can be proportional to the relative velocity between the transmitter and the receiver, and the carrier frequency of the signal being transmitted. Further mobile communication systems—including 5G systems—can utilize mmW frequencies in the 5-300 GHz spectrum, which are substantially higher than the 1-5 GHz spectrum used by today's systems. In addition, increasing the numbers antennas (i.e., $N_T$ and/or $N_R$) is expected to be an important technique for achieving performance goals for 5G systems including high data rates. In fact, as such mmW systems evolve, both the base stations and terminals could potentially utilize a multitude of antenna elements each, with the actual number of elements limited only by the physical area or volume available in each particular application.

Long Term Evolution (LTE) is an umbrella terra for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands, including the 700-MHz band in the United States. LTE is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

While LTE was primarily designed for user-to-user communications, 5G cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

To enable optimized services of different types, the length of transmit time interval (TTI) is expected to be different for different services, where URLLC may have a shorter TTI length compared to eMBB to minimize latency. As such, an eMBB block could be transmitted at the time when a URLLC data packet arrives to the transmitter. In that scenario, it can be desirable to blank (interrupt) the eMBB transmission in certain time-frequency resources and perform a ULLRC transmission on those resources. The drawback with this approach is that the wireless device receiving the (partial) eMBB will, with high probability, fail the decoding since the receiver will not notice that the URLLC packet does not belong to the eMBB data and hence it will corrupt the decoding. This may be solved by performing HARQ re-transmissions, but since soft-buffer is partly corrupt (for the resource where the first transmission was blanked) a larger number of HARQ re-transmissions could be required for correct decoding.

As mentioned above, obtaining a high peak rate and high spectral efficiency can motivate the use of large antenna arrays. While this can be preferable for services such as eMBB, the same antenna arrays may not meet the main objectives—low latency and error rate—of URLLC. For example, while narrow beams with high gain can be desirable for eMBB, such beam characteristics can impede and/or prevent the fulfillment of URLLC requirements.

Accordingly, it can be beneficial to address at least some of these issues and/or problems relating to the difference in requirements and objectives between, e.g., URLLC and eMBB.

SUMMARY

Accordingly, to address at least some of such issues and/or problems, certain exemplary embodiments of apparatus, devices, methods, and computer-readable media according to the present disclosure can transmit and/or receive data and reference signals (e.g., channel state information (CSI) reference signals (RS)), via an antenna array, in different ways depending on the data service type. For example, a greater number of CSI ports and reference symbols can be used for eMBB to provide high peak rate and spectral efficiency via narrow beams with high gains. In contrast, fewer CSI ports and wider beams can be used for URLLC in order to reduce the CSI reporting overhead and increase the robustness against errors. In this manner, exemplary embodiments of methods, systems, devices, and computer-readable media according to the present disclosure can efficiently adapt to the different needs corresponding to the different data service types, thereby vastly outperforming conventional methods, techniques, and systems in various known applications, including exemplary applications discussed herein.

In certain exemplary embodiments, it is possible to provide methods and/or procedures for determining transmission parameters used to provide a particular data service via a downlink communication channel from a network node (e.g., base station, eNB, gNB, etc., or component thereof) to a wireless communication device (e.g., UE or component of a UE, such as a modem). The exemplary methods and/or procedures can include receiving information identifying a first data service type, of a plurality of available data service types, associated with a first wireless communication device. In some exemplary embodiments, the information identifying the data service type can be received from the first wireless communication device. In some exemplary embodiments, information identifying a second data service type, associated with a second wireless communication device, can be received, the second data service type being different than the first data service type. In some exemplary embodiments, the second wireless communication device can be the same as the first wireless communication device.

The exemplary methods and/or procedures can also include configuring a first plurality of antenna elements as a second plurality of CSI ports based on the first data service type, wherein the second plurality varies for the available data service types. In some exemplary embodiments, the second plurality of CSI ports can be less than the first plurality of antenna elements when configured for a particular data service type of the available data service types. In other exemplary embodiments, the second plurality of CSI ports can be equal to the first plurality of antenna elements for the particular data service type. In some exemplary embodiments, the second plurality of CSI ports can be configured to cover a first angular range and/or to provide a first angular resolution when configured for the particular data service type and can be configured to cover a second angular and/or to provide a second angular resolution when configured for a different data service type. In some exemplary embodiments, the first and second angular ranges can be substantially identical and the first angular resolution can be less than the second angular resolution.

In some exemplary embodiments, for the particular data service type, each of the second plurality of CSI ports can be configured as a particular one of the first plurality of antenna elements. In other exemplary embodiments, for the particular data service type, each of the second plurality of CSI ports can be configured by virtualizing a portion of the first plurality of antenna elements. In some exemplary embodiments, each of the first plurality of antenna elements can be configured to provide a non-zero transmission power such that each of the second plurality of CSI ports produces a beam pattern substantially similar to a beam pattern produced by a particular one of the antenna elements.

The exemplary methods and/or procedures can include determining first downlink transmission parameters for the first data service, based on transmission or reception using the configured second plurality of CSI ports. In some exemplary embodiments, determining first downlink transmission parameters can comprise transmitting first CSR reference signals (CSI-RS) to the first wireless communication device and receiving, from the first wireless communication device, a CSI report including at least one of a rank indicator (RI), precoding matrix indicator (PMI), and a channel quality indicator (CQI). In some exemplary embodiments, the first CSI-RS can be transmitted in an angular beam sweep sequence. In other exemplary embodiments, the first CSI-RS can be transmitted in an angular direction corresponding to an estimated location of the wireless communication device. In some exemplary embodiments, one or more parameters related to the first CSI-RS transmission can be configured in accordance with the configured second plurality of CSI ports.

In other exemplary embodiments, determining first downlink transmission parameters can comprise receiving an uplink transmission from the wireless communication device using the configured second plurality of CSI ports and determining first downlink transmission parameters based on the received uplink transmission and channel reciprocity information.

Other exemplary embodiments include methods and/or procedures for determining transmission parameters used to select a network node (e.g., base station, eNB, gNB, etc., or component thereof) for providing a particular data service via a downlink communication channel to a wireless communication device (e.g., UE or component of a UE, such as a modem). The exemplary methods and/or procedures can include receiving information identifying a first data service type associated with a first wireless communication device.

The exemplary methods and/or procedures can include configuring a first plurality of antenna elements as a second plurality of CSI ports based on the first data service type. In some exemplary embodiments of the present disclosure, the second plurality of CSI ports can be less than the first plurality of antenna elements. In some exemplary embodiments, each of the second plurality of CSI ports can be configured by virtualizing a portion of the first plurality of antenna elements. In some exemplary embodiments, each of the first plurality of antenna, elements can be configured to provide a non-zero transmission power such that each of the second plurality of CSI ports produces a beam pattern substantially similar to a beam pattern produced by a particular one of the antenna elements. In further exemplary embodiments, the second plurality of CSI ports can be equal to the first plurality of antenna elements.

The exemplary methods and/or procedures can include determining first downlink transmission parameters, based on transmission or reception, using the configured second plurality of CSI ports. In some exemplary embodiments, determining first downlink transmission parameters can comprise transmitting first CSI reference signals (CSI-RS) using the configured second plurality of CSI ports, and receiving first downlink transmission parameters in response to the first CSI-RS transmissions.

The exemplary methods and/or procedures can include configuring a third plurality of antenna elements as a fourth plurality of CSI ports based on the first data service type. In some exemplary embodiments, the quantity of the fourth plurality of CSI ports can be different than the quantity of the second plurality of antenna elements. In some exemplary embodiments of the present disclosure, the fourth plurality of CSI ports can be less than the third plurality of antenna elements. In some exemplary embodiments, each of the fourth plurality of CSI ports can be configured by virtualizing a portion of the third plurality of antenna elements. In some exemplary embodiments, each of the third plurality of antenna elements can be configured to provide a non-zero transmission power such that each of the fourth plurality of CSI ports produces a beam pattern substantially similar to a beam pattern produced by a particular one of the antenna elements. In further exemplary embodiments, the fourth plurality of CSI ports can be equal to the third plurality of antenna elements.

The exemplary methods and/or procedures can include determining second downlink transmission parameters, based on transmission or reception, using the configured fourth plurality of CSI ports. In some exemplary embodiments, determining second downlink transmission parameters can comprise transmitting second CSI reference signals (CSI-RS) using the configured fourth plurality of CSI ports, and receiving second downlink transmission parameters in response to the second CSI-RS transmissions.

The exemplary methods and/or procedures can include selecting, based on the first and second downlink transmission parameters, a network node to provide first data service to the wireless communication device. In some exemplary embodiments, the controller can also select a precoding matrix for antenna elements associated with the selected network node, e.g., based on the downlink transmission parameters corresponding to the selected network node. In some exemplary embodiments, the selected network node can select the precoding matrix associated with its antenna elements.

Other exemplary embodiments include one or more network nodes (e.g., radio base station(s), evolved Node B (eNBs), controllers, etc.) configured to perform operations corresponding to the exemplary methods and/or procedures described above. Other exemplary embodiments include non-transitory, computer-readable media storing program instructions that, when executed by at least one processor, configure one or more network nodes to perform operations corresponding to the exemplary methods and/or procedures described above.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying figures showing illustrative embodiments, in which:

FIG. 10 is a flow diagram of operations comprising an exemplary method and/or procedure for a wireless communication network to determine transmission parameters for downlink communication channels from one more base stations to one or more wireless communication devices, according to one or more exemplary embodiments of the present disclosure;

FIG. 11 is a flow diagram of operations comprising another exemplary method and/or procedure for a wireless communication network to determine transmission parameters for downlink communication channels from one more base stations to one or more wireless communication devices, according to one or more exemplary embodiments of the present disclosure;

FIG. 12 is a flow diagram of operations comprising another exemplary method and/or procedure for a wireless communication network to determine transmission parameters for downlink communication channels from one more base stations to one or more wireless communication devices, according to one or more exemplary embodiments of the present disclosure;

While the present disclosure will now be described in detail with reference to the figures, it is done so in connection with the illustrative embodiments and is not limited by the particular embodiments illustrated in the figure(s) or in the appended claims.

DETAILED DESCRIPTION

Figure 1:
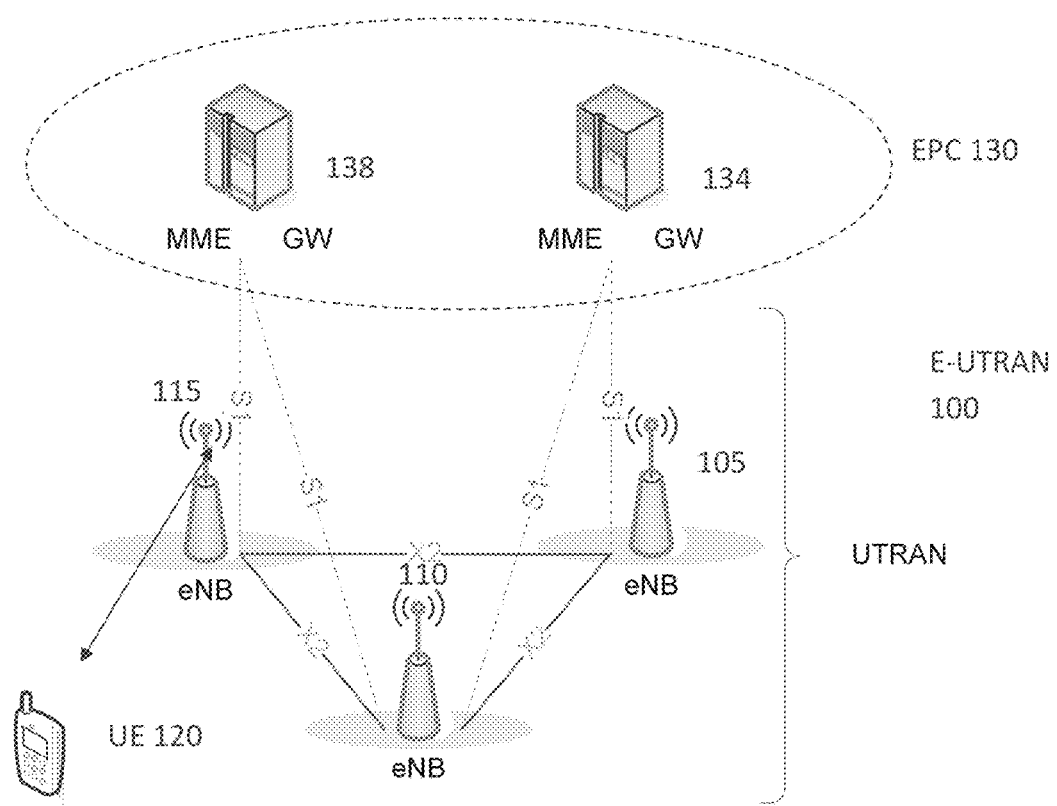
FIG. 1 is a high-level block diagram of an exemplary architecture of the Long Term Evolution (LIE) Evolved UTRAN (E-UTRAN) and Evolved Packet Core (EPC) network, as standardized by 3GPP.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling protocols between the UE and the EPC, which are known as the Non-Access Stratum (NAS) protocols. The S-GW handles all Internet Procotol (IP) data packets between the UE and the EPC, and serves as the local mobility anchor for the data bearers when the UE moves between eNBs, such as eNBs 105, 110, and 115.

Figure 2A:
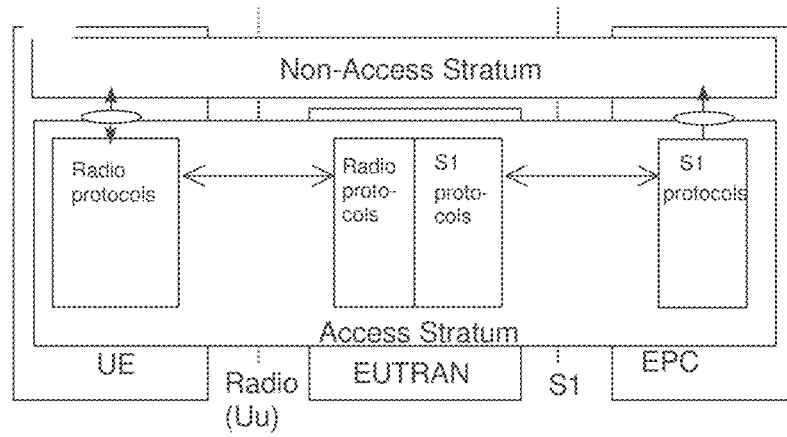
FIG. 2A is a high-level block diagram of an exemplary E-UTRAN architecture in terms of its constituent components, protocols, and interfaces.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 1 also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

Figure 2B:
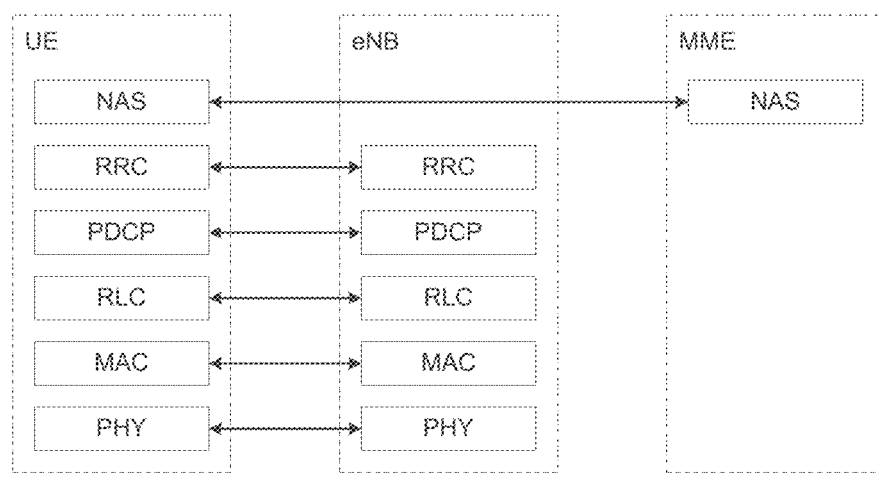
FIG. 2B is a block diagram of exemplary protocol layers of the control-plane portion of the radio (Uu) interface between a user equipment (UE) and the E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

Figure 2C:
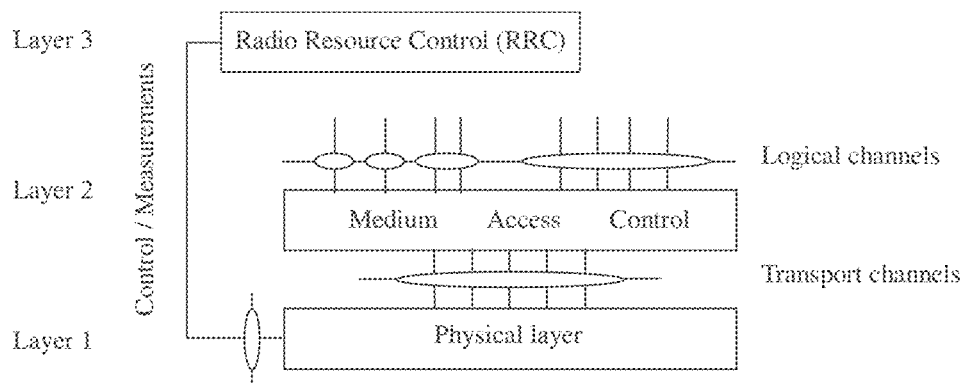
FIG. 2C is a block diagram of an exemplary LTE radio interface protocol architecture from the perspective of the PHY layer.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH).

Figure 3A:
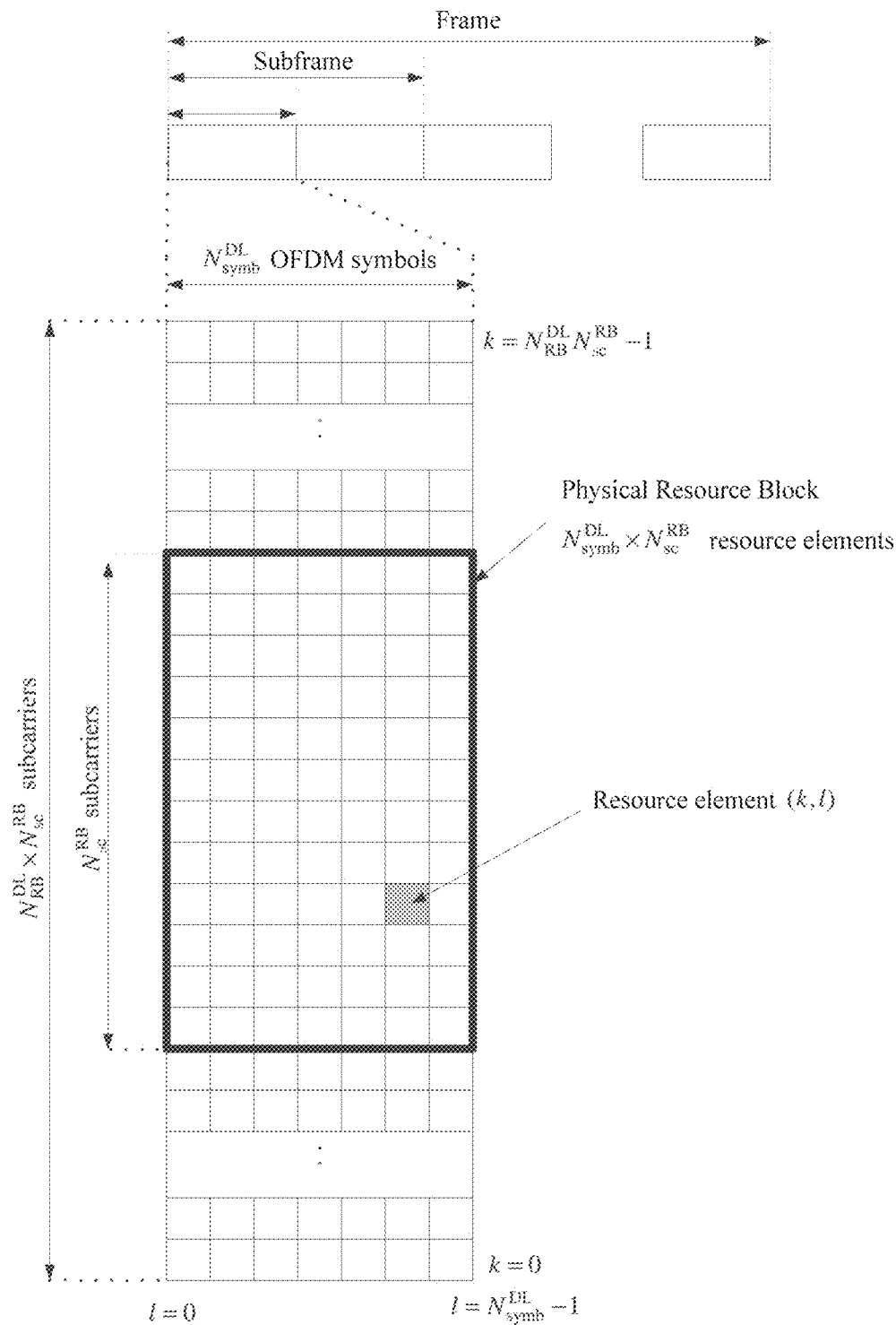
FIGS. 3A-B are exemplary diagrams illustrating the arrangement of resources in the LTE downlink radio interface used for frequency-division duplex (FDD) operation.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows the radio frame structure used for FDD downlink (DL) operation. The radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary downlink slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier bandwidth of 15 kHz. The value of $N_{sc}$ is configurable based upon the available channel bandwidth. Since persons of ordinary skill in the art are familiar with the principles of OFDM, further details are omitted in this description. An exemplary uplink slot can be configured in similar manner as shown in FIG. 3, but comprises $N^{UL}_{symb}$ OFDM symbols, each of which is comprised of $N_{sc}$ OFDM subcarriers.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY downlink comprise $N^{DL}_{RB}$ PRB pairs, each of which comprises $2N^{DL}_{symb}*N^{RB}_{sc}$REs. For a normal CP and 15-KHz sub-carrier bandwidth, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carries 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to $PRBn_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

As discussed above, the LTE PHY maps the various downlink and uplink physical channels to the resources shown in FIG. 3A. For example, the PDCCH carries scheduling assignments, channel quality feedback (e.g., CSI) for the uplink channel, and other control information. Likewise, a Physical Uplink Control Channel (PUCCH) carries uplink control information such as scheduling requests, CSI for the downlink channel, hybrid ARQ feedback, and other control information. Both PDCCH and PUCCH are transmitted on aggregations of one or several consecutive control channel elements (CCEs), and a CCE is mapped to the physical resource shown in FIG. 3A based on resource element groups (REGs), each of which is comprised of a plurality of REs. For example, a CCE may be comprised of nine (9) REGs, each of which is comprised of four (4) REs.

Figure 3B:
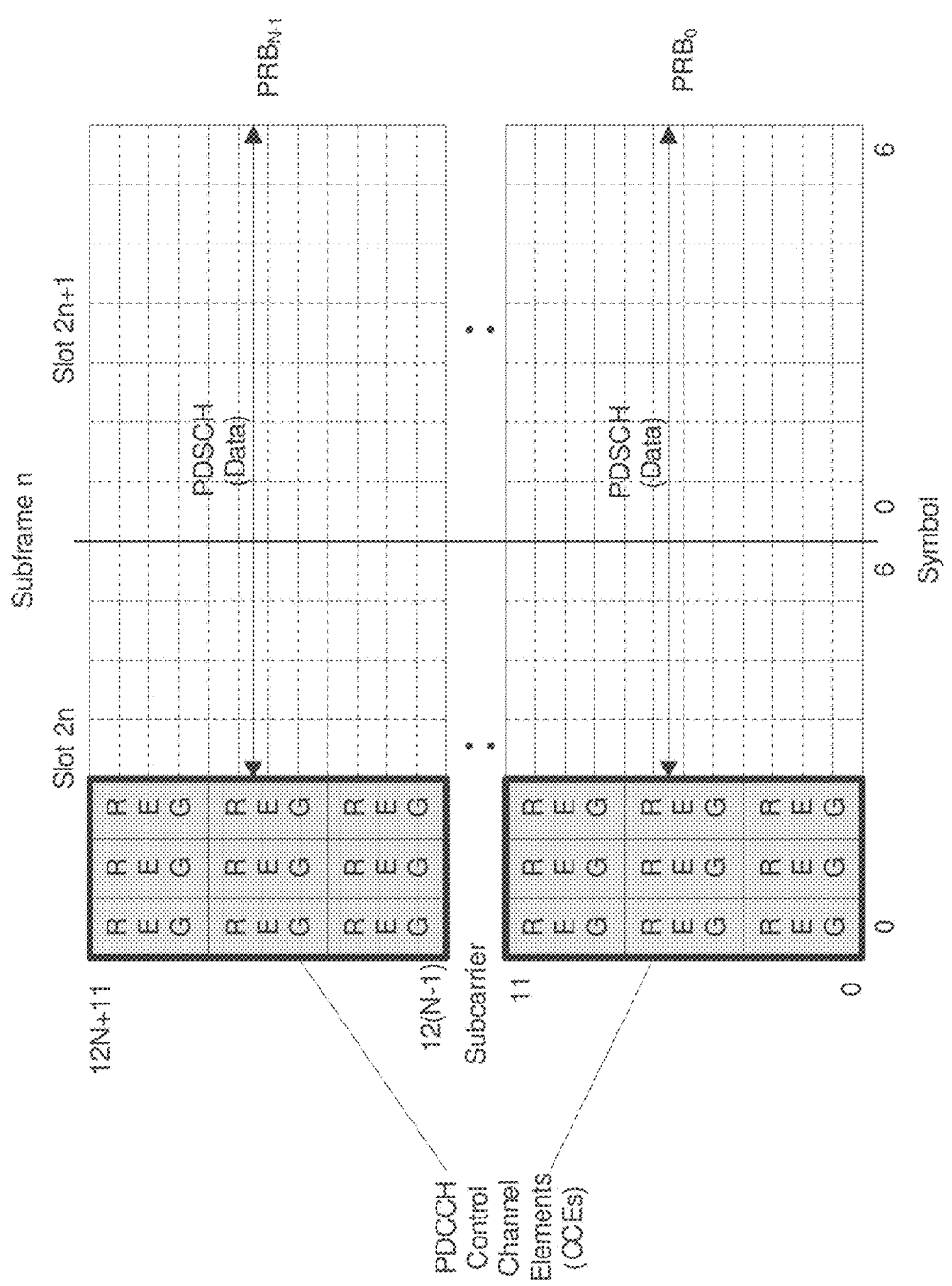

FIG. 3B illustrates one exemplary manner in which the CCEs and REGs can be mapped to the physical resource, i.e., PRBs. As shown in FIG. 3B, the REGs comprising the CCEs of the PDCCH can be mapped into the first three symbols of a subframe, whereas the remaining symbols are available for other physical channels, such as the PDSCH which carries user data. Each of the REGs comprises four REs, which are represented by the small, dashed-line rectangles. Since QPSK modulation is used for the PDCCH, in the exemplary configuration of FIG. 3B, each REG comprises eight (8) bits and each CCE comprises 72 bits. Although two CCEs are shown in FIG. 3B, the number of CCEs may vary depending on the required PDCCH capacity, determined by number of users, amount of measurements and/or control signaling, etc. Moreover, other ways of mapping REGs to CCEs will be apparent to those of ordinary skill in the art. On the uplink, PUCCH can be configured similarly, except that the number of bits per CCE varies because PUCCH uses either QPSK or BPSK depending on particular message contents.

Beginning with Release 11, the 3GPP specifications include an enhanced PDCCH (ePDCCH) in addition to the legacy PDCCH described above. The ePDCCH is intended to increase capacity and improve spatial reuse of control channel resources, improve inter-cell interference coordination (ICIC), and add antenna beamforming and/or transmit diversity support for control channel. Much like the Release 8 PDCCH, the ePDCCH is constructed by aggregating one or more enhanced control channel elements (eCCEs). An eCCE is comprised of one or more enhanced resource element groups (eREGs), each of which is comprised of one or more REs. For example, an eCCE comprised of nine eREGs, each having four REs, may be configured with the same capacity as a CCE. Unlike CCEs, however, eCCEs can be flexibly configured with various numbers and sizes of eREGs.

Moreover, the ePDCCH (i.e., eCCEs) can be mapped to PRBs for transmission either in a localized or distributed manner. The localized mapping provides frequency selective scheduling gain and beamforming gain while the distributed transmission provides robust ePDCCH transmission via frequency diversity in case valid channel state information is not available to the receiver. In order to achieve sufficient frequency diversity, however, each eCCE must be mapped to a minimum number PRBs distributed sufficiently throughout the range of sub-carriers in the physical resource.

As discussed briefly above, increasing the number of antennas (i.e., $N_T$ and/or $N_R$) is expected to be an important technique for achieving performance goals for 5G systems, such as high data rates and low latency. Both the base stations and the terminals can potentially utilize a multitude of antenna elements each, with the actual number of elements limited only by the physical area or volume available in each particular application.

Figure 4C:
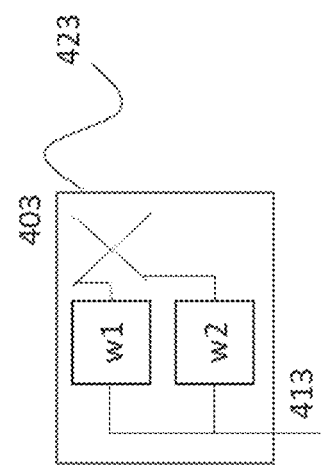
FIGS. 4A-4F are block diagrams showing various exemplary antenna elements and antenna arrays usable with one or more exemplary embodiments of the present disclosure.
Figure 4B:
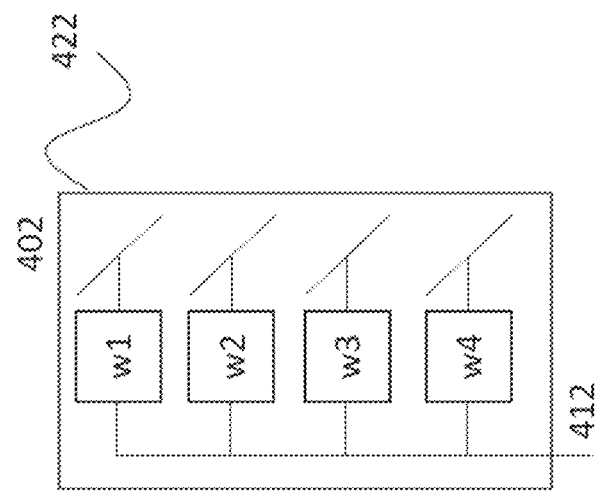
Figure 4A:
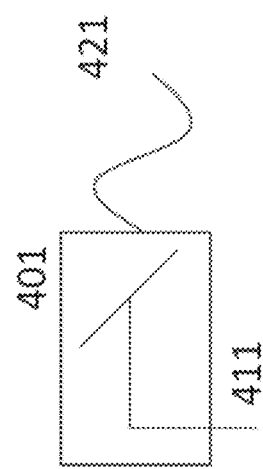

As discussed herein, the concept of an "antenna element" can represent any number of physical structures that can radiate a signal (or variations thereof) provided by a physical antenna port and/or receive a radiated signal and provide received signal to the physical antenna port. Three exemplary antenna elements are shown in FIGS. 4A-4C. The following discussion is based on transmitting antenna elements, but the skilled person will readily comprehend that the exemplary antenna elements can also be applied to receive radiated signals. FIG. 4A illustrates an antenna element 401 that receives, via physical antenna port 411, an input signal that is then transmitted by a single radiating structure as signal 421.

FIG. 4B illustrates another exemplary antenna element 402 that receives, via physical antenna port 412, an input signal that is phase-shifted by respective values w1-w4 before being applied to four separate radiating structures, resulting in transmission of composite signal 422. The values w1-w4 determine the shape of the angular beam of composite signal 412. In this example, even if the four radiating structures are physically separated in an actual antenna array, a receiver would be unable to distinguish and measure the channel from each individual radiating structure. In other words, a receiver would be able only to measure a single channel by which it received composite signal 422.

FIG. 4C illustrates another exemplary antenna element 403 that receives, via physical antenna port 413, an input signal that is phase-shifted by respective values w1-w2 before being applied to two perpendicularly-arranged radiating structures, resulting in a cross-polarized signal 423. In this example, given a proper antenna structure, it can be possible for a receiver to distinguish between the signals radiating from the two structures due to the different polarizations.

In order to achieve many of these exemplary performance improvements and to mitigate difficult operational conditions, multi-element antenna arrays can generally place difficult performance requirements on the analog-to-digital (A/D, e.g., for a receiver) and/or digital-to-analog (D/A, e.g., for a transmitter) converters employed in conjunction with the antenna array. As a consequence of such practical limitations, antenna arrays often employ one of three common processing architectures.

Figure 4E:
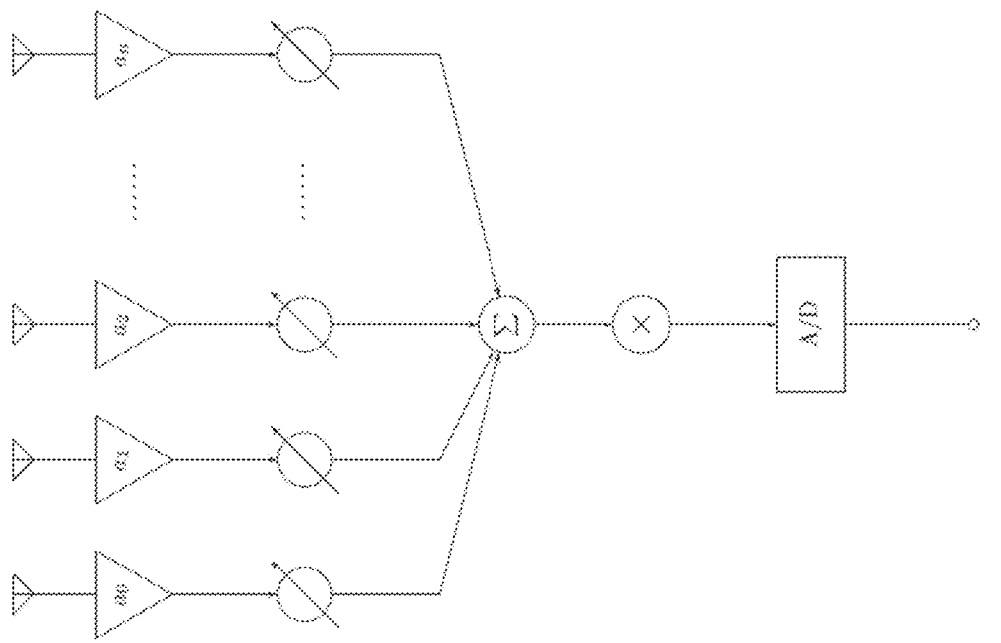
Figure 4D:
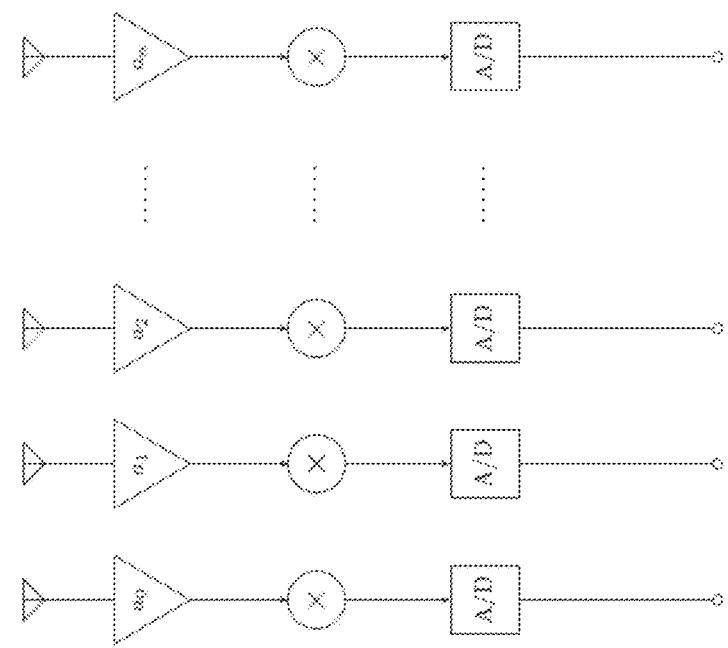

In an exemplary low-resolution digital architecture, the signal from (or to) each antenna element is processed by an individual A/D (or D/A) converter. This exemplary architecture is illustrated by the block diagram shown in FIG. 4D. This exemplary architecture can be flexible because it is able to support an arbitrary number of spatial streams and can also provide spatial division multiplexing to communicate to multiple devices simultaneously. However, this architecture can be prohibitive in energy consumption, particularly if the A/D and/or D/A converters are run at a high sampling rate and/or a high quantization resolution. Consequently, such architectures typically are operated at lower sampling rate and/or lower quantization resolution to compensate for the larger number of A/D and/or D/A converters.

In an exemplary high-resolution analog architecture, the analog signals from (or to) the antenna elements are first combined by an analog phased array, either at radio frequency (RF) or at intermediate frequency (IF, e.g., before or after the mixer). This exemplary architecture is illustrated by the block diagram shown in FIG. 4E. The combined signal can then be processed by a single A/D (or D/A) converter. Since this design requires only one A/D or D/A, it can consume less energy compared to the fully digital approach and therefore can provide higher quantization resolution. However, the analog phased array can be oriented in only one direction at a time, thereby limiting the multiple access and searching capabilities.

Figure 4F:
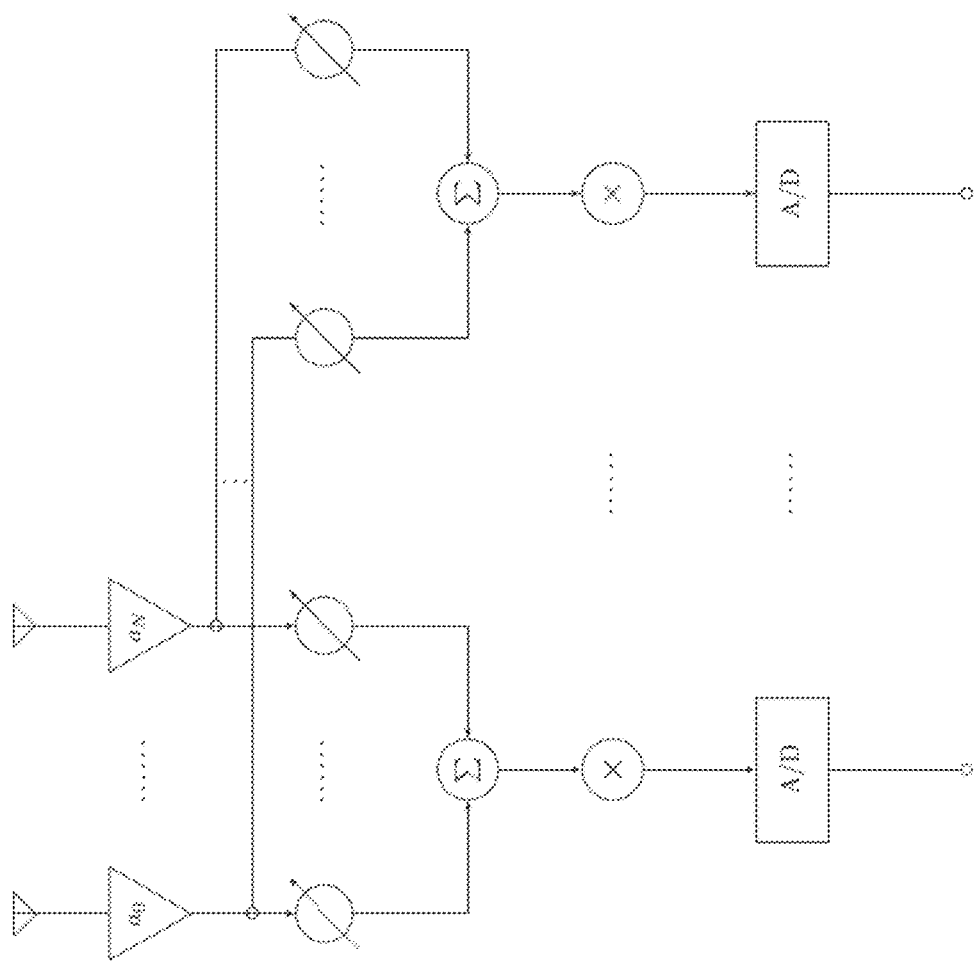

In a third exemplary architecture, e.g., a hybrid beamsteering architecture, the collection of antenna elements is divided into a plurality of clusters. Signals from all antenna elements in a cluster are combined into a single analog signal, which is then individually digitized with a single A/D converter. In the transmit direction, for example, a single D/A generates a composite analog signal that is then split into multiple signals, each fed to a particular antenna element of the cluster. This architecture is a compromise in both performance and energy consumption between the high-resolution analog and the low-resolution digital architectures. This architecture has been described by A Ghosh, et. al., "Millimeter-Wave Enhanced Local Area Systems: A High-Data-Rate Approach for Future Wireless Networks," IEEE JSAC, June 2014. A related architecture is described by Alkhateeb et al., "Hybrid Precoding for Millimeter Wave Cellular Systems with Partial Channel Knowledge," Proc. 2013 IEEE Workshop on information Theory and Applications. This exemplary architecture is illustrated by the block diagram shown in FIG. 4F.

Neither the low-resolution digital architecture nor the high-resolution analog architecture can be optimal for all scenarios in mobile wireless (e.g., cellular) applications. Moreover, the hybrid beamsteering architecture can be suboptimal for certain scenarios, since the determination of how to cluster antenna elements and the number of operational A/D and/or D/A elements are not configurable. For example, when searching for other wireless peers or tracking of the signals from those peers, a low-resolution digital architecture may offer greatly improved performance over a high-resolution analog architecture because it allows all directions to be scanned at once. The low quantization resolution on each antenna signal generally does not affect the performance since the signals are limited by thermal noise and interference rather than quantization noise. A similar situation can occur for transmitting and receiving control signals or any other signals that are designed for a low signal-to-noise ratio (SNR). One example has been described in Barati, et al, "Directional Cell Search for Millimeter Wave Cellular Systems", Proc. IEEE SPAWC, 2014. In contrast, during steady-state data reception and transmission, the high-resolution analog architecture can be preferable. In such exemplary scenario, the direction of communication has generally already been established (or at least is changing relatively slowly) and the array of antenna elements can be oriented in a single direction. The high quantization resolution is useful to enable transmission and reception at higher SNRs.

Figure 5:
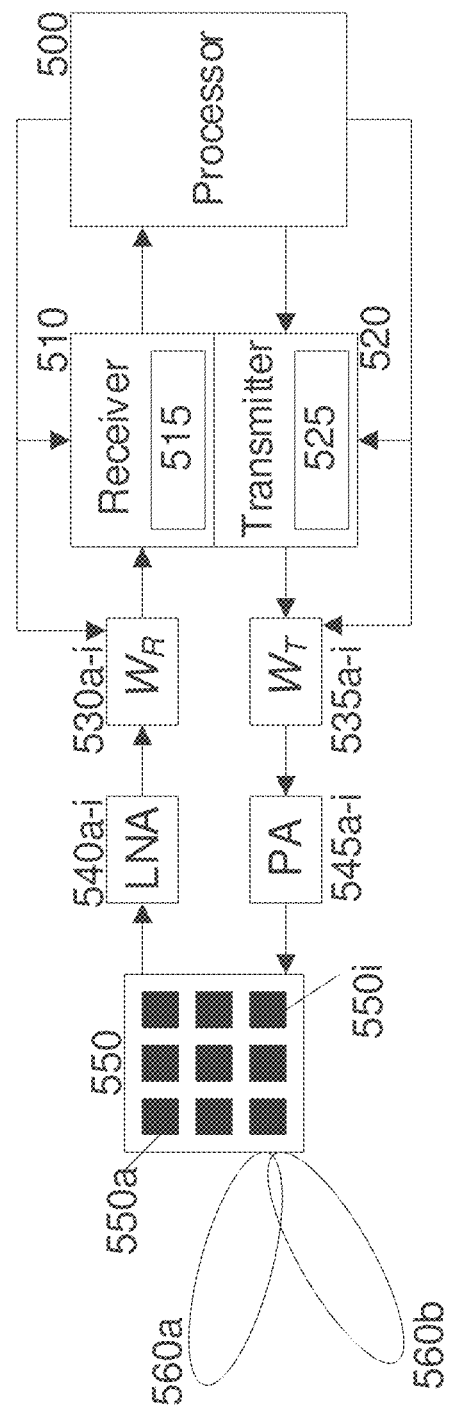
FIG. 5 is a block diagram of an exemplary apparatus and/or device (e.g., base station and/or eNB) according to one or more exemplary embodiments of the present disclosure.

FIG. 5 shows a block diagram of an exemplary apparatus and/or device according to one or more exemplary embodiments of the present disclosure. In various exemplary embodiments, the apparatus and/or device illustrated by FIG. 5 can comprise one or more of the antenna array architectures shown in FIGS. 4A-4C and described above. The exemplary apparatus shown in FIG. 5 can also include, e.g., an antenna array 550 that can comprise a plurality of individual antenna elements arranged in a particular pattern, such as, e.g., exemplary antenna elements 550a to 550i arranged in an exemplary 3-by-3 grid. In some exemplary embodiments, the antenna array 550 can be arranged as an M-by-N array of elements, where $M \geq 1$ and $N > 1$. In some exemplary embodiments, the antenna elements 550a to 550i can be arranged in a rectangular grid with equal spacing in one or both dimensions; however, other exemplary arrangements of the elements comprising the array are possible and are within the scope of the present disclosure. In addition, each element of the antenna array 550 can have various physical forms including dipole, patch, cross dipole, inverted F, inverted L, helix, Yagi, rhombic, lens, and/or any another type of antenna topology known to persons of ordinary skill.

Figure 6:
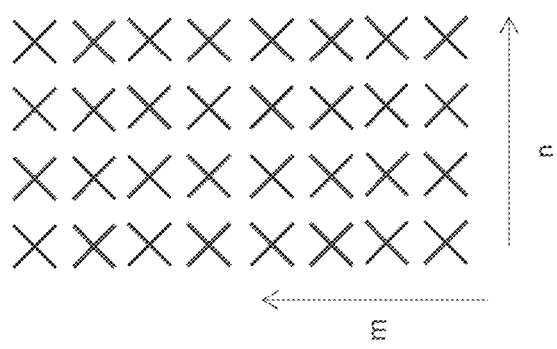
FIG. 6 is an exemplary diagram of a two-dimensional (2D) antenna array comprising cross-polarized antenna elements usable with one or more exemplary embodiments of the present disclosure.

Elements 550a to 550i can utilize various polarization patterns known to persons of ordinary skill, including horizontal, vertical, circular, and cross polarization. For example, elements 550a to 550i—as well as their arrangement in the array 550—can be designed and/or configured especially for the particular operating frequency (e.g., 5 GHz, 10 GHz, 300 GHz, etc.) and device (e.g., mobile or fixed-location terminal, cellular phone, handset, laptop, tablet, access point, base station, etc.) in which the exemplary apparatus of FIG. 5 can be used. An exemplary arrangement of thirty-two (32), cross-polarized antenna elements in an 8×4 rectangular grid is shown in FIG. 6. Such an exemplary arrangement can be utilized, e.g., in a base station.

According to certain exemplary embodiments of the present disclosure, the antenna elements 550a to 550i can be used for receiving and/or transmitting signals in combination with, respectively, other receiving and transmitting circuitry comprising the exemplary apparatus. The receiving circuitry can comprise a plurality of low-noise amplifiers (LNAs) 540a through 540i, each of which can amplify a signal received from a corresponding antenna element 550a through 550i. The exemplary apparatus can further comprise a plurality of receive gain/phase controls 530a, through 530i, each of which can receive a signal output from a corresponding (LNAs) 540a through 540i. In some exemplary embodiments, the receive gain/phase control 530 can comprise a receiver beamformer that can be controlled by, e.g., one or more processors 600. The outputs of the receive gain/phase controls 530a through 530i are provided to a receiver block 510, which can comprise a receive conversion block 515. The inputs to block 510 can be at a particular radio frequency (RF), in which case block 510 can comprise circuitry configurable to translate the signals to an intermediate frequency (IF). Nevertheless, the skilled person can readily comprehend that RF-to-IF conversion can alternately occur prior to the signals reaching receiver block 510. As indicated herein, references to "processor" should be understood to mean one or more processors, including one or more computer processors, signal processors, etc.

The output of block 515 can comprise one or more streams of digitized samples that are provided to processor 500, which can provide one or more receiver control signals for controlling various operational aspects of, e.g., receive gain/phase controls 530a through 530i, receive conversion block 515, etc. Similarly, processor 500 can provide one or more streams of digitized samples to transmitter block 520, which can comprise a transmit conversion block 525. The output of block 520 (e.g., the output of transmit conversion block 525) can comprise a plurality of analog signals, each of which can be at RF or IF, as described above for the receiving circuitry. Each of the analog signals output by transmitter block 520 can be applied to a corresponding transmit gain/phase control 535a through 535i. Processor 500 can also provide one or more transmitter control signals for controlling various operational aspects of, e.g., transmit gain/phase controls 535a through 535i, transmit conversion block 525, etc. In some exemplary embodiments, transmit gain/phase control 535 can comprise a transmit beamformer that can be controlled by, e.g., processor 500. Each of the signals output by transmit gain/phase control 535a through 535i can be applied to a corresponding transmit power amplifier (PA) 545a through 545i. The amplified outputs of the PAs can be applied to respective corresponding antenna array elements 550a through 550i.

In some exemplary embodiments, processor 500 can utilize a direction-of-arrival estimate or other available information to determine appropriate weights (e.g., $W_R$ or $W_T$) to cause the antenna array 550 to produce one or more beam patterns directed to a particular angular direction relative to the antenna array. For example, as shown in FIG. 5, by applying the appropriate weights (e.g., $W_R$ or $W_T$) to the signals received from the antenna elements 550a through 550i, the antenna array 550 can capture signals and/or multipath components that are incident in the directions of arrival corresponding to beams 560a and 560b while rejecting signals and/or multipath components that are incident other directions of arrival. In other exemplary embodiments described in more detail below, the weights can comprise and/or incorporate a precoder matrix that facilitates directing one or more beams directed to particular angular directions, e.g., for a beam sweep or to a device located at a specific position.

Processor 500 can program and/or configure receive gain/phase controls 530 and/or transmit gain/phase controls 535 with weights (e.g., $W_R$ or $W_T$, respectively) corresponding to the desired angular direction. Processor 500 can determine weights using various beamsteering or beam-forming algorithms know to persons of ordinary skill, including parametric algorithms and codebook-based algorithms. According to various exemplary embodiments, receive gain/phase controls 530 and/or transmit gain/phase controls 535 can comprise one or more programmable amplifiers that modifies the amplitude and/or phase of the signals (e.g., at RF or IF) from the array elements 550a through 550i. When no gain or phase adjustment of the signals to/from array elements 550a through 550i is required, the processor 500 can program the respective elements of controls 530 and/or 535 to unity gain and zero phase.

In further exemplary embodiments, processor 500 can comprise one or more general-purpose microprocessors, one or more special-purpose microprocessors, one or more digital signal processors (DSPs), one or more application specific integrated circuits (ASICs), and/or one or more other types of computer arrangement known to persons of ordinary skill in the art. Furthermore, processor 500 can be programmable and/or configured to perform the functions described herein by executable software code stored in an accessible memory or other type of computer-readable medium. In some exemplary embodiments, memory and/or other computer-readable medium (e.g., including RAM, ROM, memory stick, floppy drive, memory card, etc.) can be permanently programmed and/or configured with such executable software code, while in other exemplary embodiments, the memory or computer-readable medium can have the executable software code downloaded and/or configured.

More generally, persons of ordinary skill in the art will recognize that various protocols and other functions of the exemplary device shown in FIG. 5 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware. For example, such various combinations can be utilized to execute various communication protocols (e.g., PHY, MAC, RLC, RRC, etc.) specified by 3GPP and improvements described herein, including methods and/or procedures for determining transmission parameters for downlink communication channels from one more base stations to one or more wireless communication devices.

Ongoing standards development for 5G (also referred to herein as "New Radio" or "NR") and LTE includes enhanced support of MIMO antenna deployments find MIMO related techniques. LTE release 14 supports codebook-based spatial multiplexing for 32 antenna elements—such as the exemplary arrangement shown in FIG. 6—with channel dependent precoding. The spatial multiplexing mode is aimed for high data rates in favorable channel conditions.

MIMO operation can be described mathematically as follows. A symbol vector s carrying r information symbols is multiplied by an $N_T \times r$ precoder matrix W, which serves to distribute the transmit energy in a subspace of the $N_T$-dimensional vector space, corresponding to $N_T$ antenna elements. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

Given the OFDM arrangement in the LTE uplink and downlink (discussed above), the received $N_R \times 1$ vector $y_n$ for a certain TFRE on subcarrier n (or alternatively data TFRE number n) can be modeled by $$y_n = H_n W s_n + e_n$$

where $e_n$ is a noise/interference vector obtained as realizations of a random process. The precoder can be a wideband precoder, which is constant over frequency, or frequency selective.

The precoder matrix W can be chosen to match the characteristics of the $N_R \times N_T$ MIMO channel matrix $H_n$, resulting in so-called channel dependent precoding. For example, the precoder matrix W can be chosen to focus the transmit energy into a subspace which is strong in the sense of conveying much of the transmitted energy to the UE. Furthermore, the transmission rank, and thus the number of spatially multiplexed layers, can be reflected in the number of columns of the precoder. For efficient performance, it can be important to obtain channel state information (CSI) about the channel $H_n$.

In LTE Release-10, a CSI-specific reference symbol sequence (known as CSI-RS) was introduced for the intent to estimate channel state information for the downlink channel, and it will be included in NR as well. By measuring a CSI-RS, a UE can estimate the effective downlink channel including the radio propagation channel and antenna gains. In mathematical form, this implies that if a known CSI-RS signal x is transmitted, a UE can estimate the coupling between the transmitted signal and the received signal (i.e., the effective channel). If no virtualization is performed in the transmission, then the received signal y can be expressed as $$y = Hx + e$$

and the UE can estimate the effective channel H and provide CSI feedback (e.g., a CSI report) to the base station.

Various forms of CSI-RS can be utilized in exemplary embodiments described herein. The above mathematical explanation was based on non-precoded CSI-RS, meaning that one CSI-RS port is mapped to a single antenna element. Such mappings produce cell-specific CSI-RS, e.g., CSI-RS broadcasted over the entire cell coverage area. However, in LTE Rel. 13, beamformed (or precoded) CSI-RS was introduced. These CSI-RSs are intended to be UE-specific instead of cell-specific, so that each LTE is assigned a dedicated CSI-RS resource. Such beamformed CSI-RS can utilize fewer CSI ports than non-precoded CSI-RS, and often produce a narrower main beam that is intended to cover a particular UE of interest and not the entire cell coverage area. Using LTE terminology, non-preceded CSI-RS transmission schemes are denoted "Class A eMIMO-Type" while beamformed CSI-RS transmission schemes are denoted "Class B eMIMO-Type."

An alternative way of utilizing precoded, or beamformed, CSI-RS is to transmit a sequence of beamformed CSI-RSs in order to cover the entire cell coverage area, so called beam sweeping. The beam sweeping approach is typically a necessity when using analogue beamforming at higher frequencies since the analogue beamforming network is typically wideband so that only a single beam can be transmitted in a given tune instance. To cover the entire cell, the CSI-RS beam must be swept sequentially in time. However, beam sweeping is applicable to digital beamforming as well. Beam sweeping may be described as transmitting a sequence of different signals $x_k = W_k x'_k$ for different values of k. The UE can then measure the received signal corresponding to each k and feedback CSI corresponding to these measurements. Each precoder $W_k$ will correspond to a certain beam pattern and thus, several different beams are tested and evaluated. A drawback with this approach is that the number of precoders $W_k$ needed to be evaluated becomes quite large when the number of antenna elements in the array is large since the beam pattern generated by the array typically is very narrow.

The above-described embodiments utilize CSI-RS transmitted in the downlink, whereby the UE then measures the reference signal and provides feedback to the gNB. However, if transmitter-receiver reciprocity can be assumed and/or maintained, the CSI can instead be estimated based on transmissions in the uplink. This is mainly applicable in TDD arrangements and enables obtaining CSI based on, e.g., UE sounding reference signal (SRS) transmissions.

Recent 3GPP standardization activity indicate support for two-dimensional antenna arrays where each antenna element has an independent phase and amplitude control, thereby enabling beamforming in both in the vertical and the horizontal dimension. Such antenna arrays may be described, at least in part, by the number of antenna columns corresponding to the horizontal dimension $M_h$, the number of antenna rows corresponding to the vertical dimension $M_v$, and $M_p$ corresponding to the number of different polarizations. The total number of antennas is thus $M = M_h M_v M_p$. For example, the exemplary antenna array shown in FIG. 6 would comprise 4×8×2=64 individually-controllable antennas. A special subset of 2D antenna arrays are 1D arrays which is the set of antenna arrays where $M_h=1$ and $M_v>1$ or $M_h>1$ and $M_v=1$.

As explained above, the concept of an "antenna element" is non-limiting since it can refer to any virtualization (e.g., linear mapping) of a transmitted signal to one or more physical radiating structures via a physical antenna port. For example, the number of CSI ports used or needed to measure CSI (e.g., the CSI granularity or dimensionality) can be different than the total number of antenna elements. Furthermore, in exemplary embodiments where the channel is measured by the gNB in the uplink, the granularity of the acquired CSI is dependent on dimensionality of the received signal in the uplink, which corresponds to the granularity of acquired CSI based on a number of antenna elements with the same dimensionality in the downlink.

Figure 7A:
FIGS. 7A-B illustrate an exemplary mapping of antenna elements to Channel State Information Reference Signals (CSI-RS) ports, along with a further mapping of CSI-RS transmitted via the CSI-RS ports into physical resource blocks (PRBs) on the LTE downlink radio interface, usable with one or more exemplary embodiments of the present disclosure.

For an antenna with N antenna elements it can be desirable to perform a mapping, visualization, or reduction (e.g., using a lower number of CSI ports) when obtaining CSI, e.g., M-port CSI-RS on the antenna where M<N. Note that the terms "CSI ports" and "CSI-RS ports" are used interchangeably herein. In addition, "mapping" can be understood as a relationship between antenna elements and CSI ports, such that "mapping" antenna elements to CSI ports and "mapping" CSI ports to antenna elements have substantially the same meaning. A block diagram illustrating an exemplary arrangement for mapping, visualization, and/or reduction is shown in FIG. 7A.

Figure 7B:
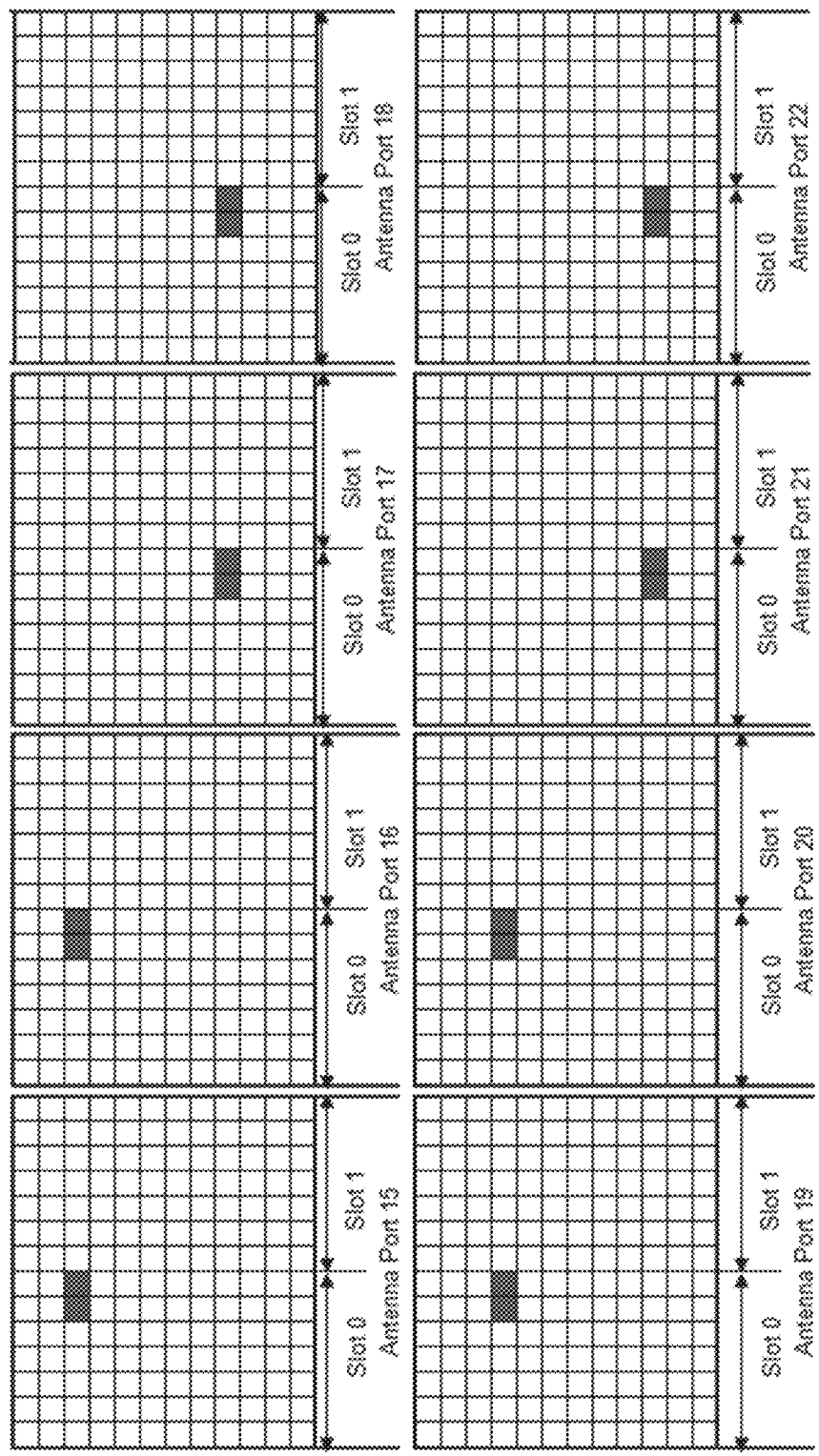

As an example, it can be desirable to map or reduce the 32- (or 64-) element antenna array shown in FIG. 6 to eight (8) CSI ports for CSI acquisition. In such an exemplary arrangement, the CSI-RS for each CSI port can be transmitted on various TFRE's in the downlink resource grid corresponding to that CSI port. FIG. 7B illustrates an exemplary mapping of eight-port CSI-RS to the LTE FDD downlink resource grid.

Port reduction can be performed in various ways. In some embodiments, port reduction can be performed by essentially "turning off" a portion of the antenna elements, such that only the remaining portion of the antenna elements is used for CSI acquisition (e.g., CSI-RS transmission). In this case, the reported CSI would correspond to the used portion of the antenna array. A similar approach of turning off portions of the array can be applied for CSI beam sweeping. As such, turning off antenna elements can reduce the number of beams and provide a corresponding reduction in the amount of CSI to evaluate. While this reduces processing overhead, the port-reduced beams can be wider and thus the obtained channel estimate will be of coarser granularity.

Figure 8:
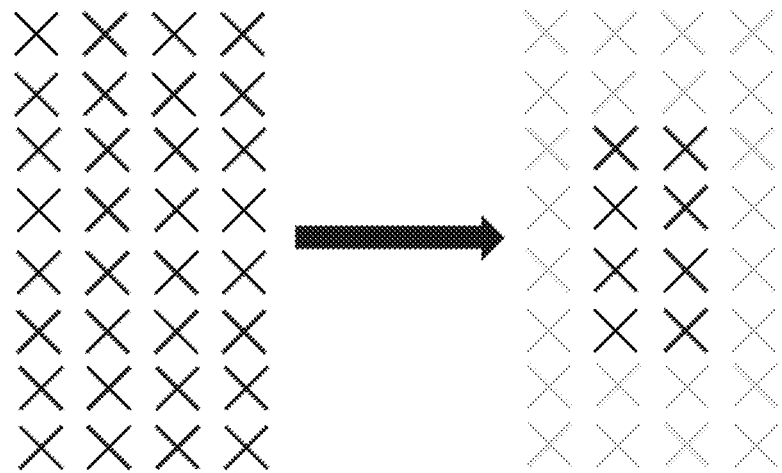
FIG. 8 is an exemplary mapping and/or reduction of antenna elements to a lesser number of CSI ports, according to one or more exemplary embodiments of the present disclosure.

An alternate port reduction approach is to visualize the available antenna elements in such a manner that only a subspace of the channel is seen. This can be done by in such a way that a M×N antenna element layout is transformed into a Q×P CSI port layout where M>Q and/or N>P. FIG. 8 illustrates a virtualized port reduction whereby the 8×4 antenna elements (at left) are virtualized so that they correspond to the 4×2 CSI port layout (at right). As such, the UE will effectively experience a 4×2 CSI port layout.

As mentioned above, the use of large antenna arrays is to a large extent motivated by obtaining a high peak rate and high spectral efficiency. While this can be preferable for services such as eMBB, the same antenna arrays may be unable to meet the main objectives—low latency and error rate—of URLLC. In other words, narrow beams with high beamforming gain can be desirable for eMBB, such beam characteristics can impede and/or prevent the fulfillment of requirements for URLLC. For example, antenna array s having a large number of antenna elements will typically correspond to a relatively large overhead in terms of CSI-RS. This can make it difficult to obtain CSI reports with a very low latency (in particular for the case of analog antenna arrays), since CSI-RS corresponding to a high number of CSI-RS ports must be transmitted.

Using a large antenna array with many antenna elements can also produce narrow beams with high beamforming gains, but at the expense of reliability/robustness. For example, directing a narrow beam in the slightly wrong direction could cause a radical drop in SINR experienced by the targeted UE—an undesirable situation for reliability-focused services such as URLLC. Similarly, while a UE may experience good performance when squarely within the narrow, high-gain beam, this performance can drop dramatically when the UE moves outside, or even to the edge, of the narrow beam. This can lead to reduced reliability due to excessive beam selection within a particular serving node and even reselection of a serving node to provide the beam.

To address these and other exemplary problems and/or issues, exemplary embodiments of the present disclosure can transmit and/or receive data and CSI-RS, via an antenna array, in different ways depending on the data service type. For example, the maximal and/or larger number of CSI ports can be used for eMBB to provide high peak rate and spectral efficiency via narrow beams with high gains. In contrast, a smaller number of CSI ports—and corresponding wider beams—can be used for URLLC in order to reduce the CSI reporting overhead and increase the robustness against errors. In this manner, exemplary embodiments of methods, systems, devices, and computer-readable media according to the present disclosure can efficiently adapt to the different needs corresponding to the different data service types.

Exemplary embodiments can effectively address two different types of UEs: UE_eMBB that is intended to operate with eMBB service type, and UE_ULLRC that is intended to operate with ULLRC service type. In such exemplary embodiments, the base station (e.g., eNB or gNB) will adapt how it transmits and/or receives the data and the reference signals to/from the different UEs. For example, the base station can accomplish this by configuring the antenna array such that CSI acquisition for UE_eMBB can utilize a high number of CSI ports thereby producing CSI of higher (e.g., finer) granularity, while CSI acquisition for UE_ULLRC can utilize a lower number of CSI ports thereby producing CSI of lower (e.g., coarser) granularity.

The UE service type (e.g., eMBB and/or ULLRC) can be determined by the network in different ways. In some exemplary embodiments, a UE can report its service capabilities to the network, which then configures the UE to a particular service type from among the capabilities. In other exemplary embodiments, a UE can request a certain service type, which is then configured by the network. This UE configuration can be distributed within the network from serving node (e.g., base station, gNB, etc) to adjacent nodes. Moreover, in some exemplary embodiments, the network also adjusts other UE transmission parameters depending on UE capabilities and/or requested service. Exemplary transmission parameters include TTI length (transmission duration), SCS, transmission profile, and transmission mode. For example, a UE configured for ULLRC could also be configured for a transmission mode using diversity schemes such as space frequency block coding (SFBC), Cyclic Delay Diversity (CDD), precoder cycling, layer permutation, etc. Moreover, the SFBC technique known as Alamouti coding could be configured for URLLC along with a corresponding two CSI ports, e.g., by performing a mapping or port reduction from N to 2 CSI ports and then applying Alamouti coding on these two CSI ports.

Figure 9:
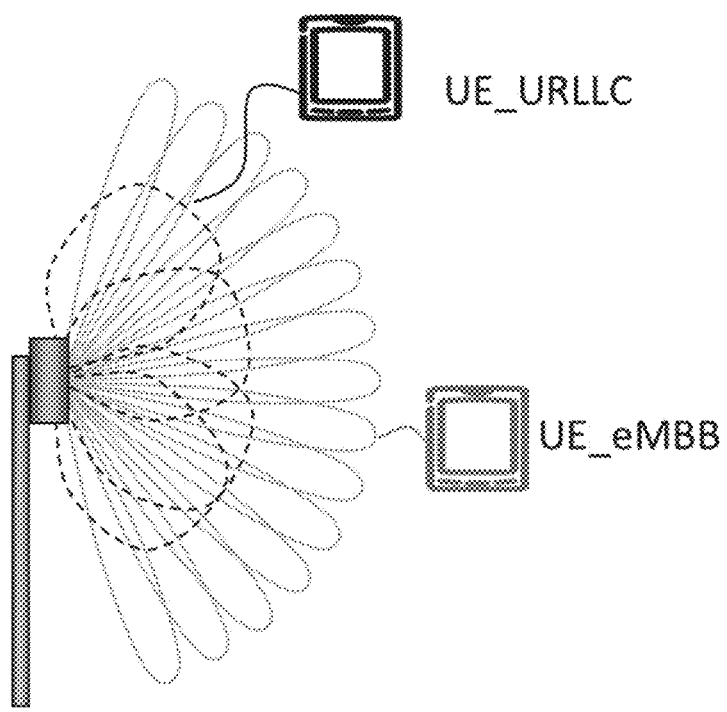
FIG. 9 illustrates two exemplary antenna beam patterns provided by a base station (e.g., eNB) for two UEs supporting two corresponding data service types, according to one or more exemplary embodiments of the present disclosure.

FIG. 9 illustrates two exemplary antenna beam patterns provided by a base station (e.g., eNB) for two UEs supporting two corresponding data service types, according to one or more exemplary embodiments of the present disclosure. In FIG. 9, UE_eMBB provides CSI with a higher (e.g., finer) angular granularity such that the gNB can transmit data to this UE with a high beamforming gain corresponding to narrow beams illustrated by solid lines. In contrast, UE_URLLC provides CSI with a lower (e.g., coarser) angular granularity such that the gNB can transmit data to this UE with narrower beams with less beamforming gain (dashed lines). As illustrated in FIG. 9, both UEs may be served simultaneously such that the respective CSI reports can be obtained in parallel. Furthermore, the gNB covers the substantially same angular range for both UEs, albeit with different numbers of CSI ports and, hence, different CSI angular granularity.

In one embodiment of the system illustrated by FIG. 9, the gNB is equipped with an antenna having the ability to operate using 32 antenna elements. For UE_eMBB, this antenna is used with 32 CSI ports to obtain CSI corresponding to the finest possible angular granularity for the given antenna array. Based on this feedback, a potentially very narrow beam can be produced which, at least for line-of-sight transmission, will result in a high SNR and, consequently, a high spectral efficiency and/or peak data rate. For UE_ULLRC, the gNB can perform a port reduction such that a lower number of CSI ports (e.g., four) are linearly virtualized from the 32 antenna elements. Consequently, the UE_ULLRC will report CSI corresponding to four CSI ports, even though these CSI ports are virtualized from all 32 antenna elements available in the antenna array. Moreover, the reported CSI can correspond to lower granularity than the reported CSI for the eMBB configuration. Based on this reduced amount of feedback, the gNB can produce a wider beam that can provide greater reliability for UE_ULLRC, albeit at the expense of lower peak data rate.

In other exemplary embodiments of the system illustrated by FIG. 9, either or both types of CSI feedback can be obtained by performing respective beam sweeping procedures. Such procedures can be used, for example, to cover an angular region that is broader than coverage for a single beam (e.g., coverage of an entire cell or sector). In this case the beam sweep corresponding to UE_MBB can be based on a higher number of CSI ports than the number of CSI ports used for UE_URLLC. As such, the number of beams in the UE_eMBB beam sweep can be larger than number of the beams in the UE_URLLC beam sweep. The UE_URLLC beams can also be wider than the UE_eMBB beams, as discussed above. Note, however, that "beam sweep" as used herein is not limited to any particular sequential (e.g., temporal) order of the respective angular beams comprising the sweep.

In other exemplary embodiments of the system illustrated by FIG. 9, a beam sweep may be unnecessary due to the existing of a priori information about the location, angular orientation, and/or direction of a UE relative to the transmitting antenna array (e.g., in the base station or gNB). Such information can be obtained, e.g., via measurements made by the UE and/or the base station, and can be utilized to identify a particular precoder matrix W corresponding to a subspace of the channel. Precoded CSI-RS can then be transmitted according to the UE service type, e.g., with a larger number of CSI ports for eMBB than for URLLC as described above.

In other exemplary embodiments illustrated by FIG. 9, the base station can determine CSI based on measurements from UE uplink transmissions and information relating to uplink-downlink reciprocity of the channel. Such reciprocity information can be based on, or derived from, a particular operating mode such as TDD. For example, the UE can transmit sounding reference signal (SRS), from which the base station can estimate the downlink-channel. In the case of UE_eMBB, the base station can base this estimate on reception using non-reduced CSI ports (e.g., M=N), from which it can determine highly granular CSI and, consequently, a downlink precoding matrix usable to generate a narrow beam with high gain for downlink data transmission. In the case of UE_URLLC, the base station can base this estimate on reception using a reduced number of CSI ports (e.g., M<N), from which it can determine less granular CSI and, consequently, a downlink preceding matrix usable to generate a broader beam with lower gain for downlink data transmission. Furthermore, once the base station determines these beam weights based on the UE's uplink transmission (e.g., of SRS), the base station can utilize them for receive beamforming of the uplink data transmission from the UE. In such case, the base station can utilize a wider, lower-gain beam for UE_URLLC and a narrower, higher-gain beam for UE_eMBB according to the respective requirements.

Although the terms "UE_eMBB" and "UE_URLLC" in are used in the examples above to describe two UEs with different performance requirements, embodiments of the present disclosure are equally applicable to a single UE supporting two services with different services requirements (e.g., eMBB and URLLC). In such case, the base station can be configured to transmit (and the UE configured to receive) the respective services utilizing the respective beam configurations described above. For example, the base station and UE can be configured to communicate sequentially with respect to the two services, e.g., first eMBB is transmitted for a duration, then URLLC is transmitted for a duration, etc. The durations can be any length(s) that is(are) compatible with the underlying radio interface, e.g., by symbol, by timeslot, by subframe, etc. In other exemplary embodiments, the base station and UE can be configured to communicate the two services substantially simultaneously using the respective beam configurations on different frequencies.

Although the above example is described in terms of a single base station providing both eMBB and URLLC service to a single UE using corresponding CSI and antenna array configurations, in other embodiments the UE can receive the two services from different base stations (e.g., different cells). For example, a UE receiving both services can be located such that: 1) it can receive a narrow, high-gain beam required for eMBB service from a first base station (e.g., gNB1) better than from a second base station (e.g., gNB2); and 2) it can receive a broader, lower-gain beam required for URLLC service from gNB2 better than from gNB1. As such, this can result in the UE selecting different base stations (e.g., different cells) to provide the two services. Subsequently, the UE can receive CSI-RS and data corresponding to eMBB from gNB1, and CSI-RS and data corresponding to URLLC from gNB2.

Furthermore, exemplary embodiments of the present disclosure can utilize various port reduction techniques to achieve the improvements described above. In general, a CSI port to antenna element mapping can be expressed as:

$$p_{antenna}^{N \times 1} = C p_{CSI}^{M \times 1}$$

As an example, consider an eight-element antenna arranged in a 4×1 configuration, e.g. each having horizontal and vertical polarization. In such case, $p_{antenna}^{8 \times 1}$ is an 8×1 vector corresponding to the eight signals applied to the respective physical antenna ports:

$$p_{CSI}^{2 \times 1} = \begin{bmatrix} p_{CSI}^1 \\ p_{CSI}^2 \end{bmatrix}$$

correspond to two CSI ports, and C is an 8×2 matrix that can be configured with values corresponding to various port reduction techniques, with the top four rows of C corresponding to one polarization (e.g., horizontal) and the bottom four rows corresponding to the other polarization (e.g., vertical).

In some exemplary embodiments, a port reduction can be configured such that each CSI port is mapped to a single antenna element, as illustrated by the exemplary port mapping matrix below:

$$C = \begin{bmatrix} 1 & 0 \\ 0 & 0 \\ 0 & 0 \\ 0 & 0 \\ 0 & 1 \\ 0 & 0 \\ 0 & 0 \\ 0 & 0 \end{bmatrix}$$

In other exemplary embodiments, a port reduction can be configured such that each CSI port is mapped to multiple antenna elements, as illustrated by the exemplary port mapping matrix below:

$$C = \begin{bmatrix} 1 & 0 \\ 1 & 0 \\ 1 & 0 \\ 1 & 0 \\ 0 & 1 \\ 0 & 1 \\ 0 & 1 \\ 0 & 1 \end{bmatrix}$$

In the above example, however, the resulting CSI ports will have relatively narrow beams due to the physical separation of the multiple antenna elements. In some exemplary embodiments, each CSI port can be mapped to a plurality of antenna elements in such a way that the resulting antenna patterns from the CSI ports, experienced by the UE, has substantially similar properties to the antenna pattern from a single antenna element. In such exemplary embodiments, each of the antenna elements can be configured to transmit the CSI-RS applied to the mapped CSI ports using a non-zero transmission power and a particular phase shift, as illustrated by the exemplary port mapping matrix below:

$$C = \begin{bmatrix} 1 & 0 \\ 0 & 1 \\ 1 & 0 \\ 0 & 1 \\ j & 0 \\ 0 & j \\ -j & 0 \\ 0 & -j \end{bmatrix}$$

FIG. 10 shows a flow diagram of an exemplary method and/or procedure for determining transmission parameters used to provide a particular data service via a downlink communication channel from a network node (e.g., base station, eNB, gNB, etc., or component thereof) to a wireless communication device (e.g., UE or component of a UE, such as a modem), according to one or more exemplary embodiments of the present disclosure. The exemplary method shown in FIG. 10 can be implemented, for example, in a network node configured according to FIG. 5 (described above) and/or FIG. 13 (described below). Although the method is illustrated by blocks in the particular order of FIG. 10, this order is merely exemplary and the steps of the method may be performed in a different order than shown by FIG. 10, and may be combined and/or divided into blocks having different functionality.

For example, in block 1000, the network node can receive information identifying a first data service type, of a plurality of available data service types, associated with a first wireless communication device. In some exemplary embodiments, the information identifying the data service type is received from the first wireless communication device. In some exemplary embodiments, the network node can receive information identifying a second data service type, associated with a second wireless communication device, the second data service type being different than the first data service type. In some exemplary embodiments, the second wireless communication device can be the same as the first wireless communication device.

In block 1010, the network node can configure a first plurality of antenna elements as a second plurality of CSI ports based on the first data service type, wherein the second plurality varies for the available data service types. In some exemplary embodiments, the second plurality of CSI ports can be less than the first plurality of antenna elements when configured for a particular data service type of the available data service types. In other exemplary embodiments, the second plurality of CSI ports can be equal to the first plurality of antenna elements for the particular data service type. In some exemplary embodiments, the second plurality of CSI ports can be configured to cover a first angular range and/or to provide a first angular resolution when configured for the particular data service type and can be configured to cover a second angular range and/or to provide a second angular resolution when configured for a different data service type. In some exemplary embodiments, the first and second angular ranges can be substantially identical and the first angular resolution can be less than the second angular resolution.

In some exemplary embodiments, for the particular data service type, each of the second plurality of CSI ports can be configured as a particular one of the first plurality of antenna elements. In other exemplary embodiments, for the particular data service type, each of the second plurality of CSI ports can be configured by virtualizing a portion of the first plurality of antenna elements. In some exemplary embodiments, each of the first plurality of antenna elements can be configured to provide a non-zero transmission power such that each of the second plurality of CSI ports produces a beam pattern substantially similar to a beam pattern produced by a particular one of the antenna elements.

In block 1020, the network node can determine first downlink transmission parameters for the first data service, based on transmission or reception using the configured second plurality of CSI ports. In some exemplary embodiments, determining first downlink transmission parameters can comprise transmitting first CSI reference signals (CSI-RS) to the first wireless communication device and receiving from the first wireless communication device, a CSI report including at least one of a rank indicator (RI), precoding matrix indicator (PMI), and a channel quality indicator (CQI). In some exemplary embodiments, the first CSI-RS can be transmitted in an angular beam sweep sequence. In other exemplary embodiments, the first CSI-RS can be transmitted in an angular direction corresponding to an estimated location of the wireless communication device. In some exemplary embodiments, one or more parameters related to the first CSI-RS transmission can be configured in accordance with the configured second plurality of CSI ports.

In other exemplary embodiments, determining first downlink transmission parameters can comprise receiving an uplink transmission from the wireless communication device using the configured second plurality of CSI ports and determining first downlink transmission parameters based on the received uplink transmission and channel reciprocity information.

FIG. 11 shows a flow diagram of another exemplary method and/or procedure for determining transmission parameters used to provide a particular data service via a downlink communication channel from a network node (e.g., base station, eNB, gNB, etc., or component thereof) to a wireless communication device (e.g., UE or component of a UE, such as a modem), according to one or more exemplary embodiments of the present disclosure. The exemplary method illustrated in FIG. 11 can be implemented, for example, in a network node configured according to FIG. 5 (described above) and/or FIG. 13 (described below). Although the method is illustrated by blocks in the particular order of FIG. 11, this order is merely exemplary and the steps of the method, may be performed in a different order than shown by FIG. 11, and may be combined and/or divided into blocks having different functionality. Furthermore, the exemplary method and/or procedure shown in FIG. 11 can be implemented in accordance with the exemplary method and/or procedure shown in FIG. 10, described above.

In block 1100, the network node can receive a data service type indication from a UE. In block 1110, the network node can determine whether the indicated data service type is URLLC or eMBB. If the network node determines that the data service type is URLLC, the operations can proceed to block 1120. In block 1120, the network node can configure a plurality of antenna elements as a plurality of reduced CSI ports. However, if the network node determines that the data service type is eMBB, the process can proceed to block 1125. In block 1125, the network node can configure a plurality of antenna elements as a plurality of full CSI ports. In block 1130, the network node can configure CSI-RS transmission parameters, e.g., SCS, TM, TTI, transmission profile. For example, the operations shown in blocks 1120-1130 can correspond to certain embodiments of the operations shown in block 1010 of FIG. 10, described above.

In block 1140, the network node can transmit CSI-RS based on the configuration. In block 1150, the network node can receive a RI, PMI, and a CQI from the UE. In block 1160, the network node can transmit data for the service indicated by the UE, based on selected transmission parameters. For example, the operations shown in blocks 1140 and 1150 can correspond to certain embodiments of the operations shown in block 1020 of FIG. 10, described above.

While the exemplary methods and/or procedures illustrated in FIGS. 10 and 11 are described in terms of being performed by a network node in relation to downlink communication from the network node (e.g., eNB or gNB) to a device (e.g., UE), in some embodiments they can be performed by a device in relation to uplink communication from the device to the network node and/or device-to-device communication.

FIG. 12 shows a flow diagram of another exemplary method and/or procedure for determining transmission parameters used to select a network node (e.g., base station, eNB, gNB, etc., or component thereof) for providing a particular data service via a downlink communication channel to a wireless communication device (e.g., UE or component of a UE, such as a modem), according to one or more exemplary embodiments of the present disclosure. The exemplary method shown in FIG. 12 can be implemented, for example, in one or more network nodes configured according to FIG. 5 (described above) and/or FIG. 13 (described below). While the exemplary method/procedure illustrated in FIG. 12 is described in terms of being performed by one or more network nodes (e.g., eNB, gNB, radio network controller (RNC), etc.) in relation to downlink communication to a device, in some embodiments it can be performed by a device in relation to uplink communication from the device to a network node or to one or more other devices. Although the method is illustrated by blocks in the particular order of FIG. 12, this order is merely exemplary and the steps of the method may be performed in a different order than shown by FIG. 12, and may be combined and/or divided into blocks having different functionality.

For example, in block 1200, the wireless network can receive information identifying a first data service type associated with a first wireless communication device. In block 1210, a first network node can configure a first plurality of antenna elements as a second plurality of CSI ports based on the first data service type. In some exemplary embodiments of the present disclosure, the second plurality of CSI ports can be less than the first plurality of antenna elements. In some exemplary embodiments, each of the second plurality of CSI ports can be configured by virtualizing a portion of the first plurality of antenna elements. In some exemplary embodiments, each of the first plurality of antenna elements can be configured to provide a non-zero transmission power such that each of the second plurality of CSI ports produces a beam pattern substantially similar to a beam, pattern produced by a particular one of the antenna elements. In further exemplary embodiments, the second plurality of CSI ports can be equal to the first plurality of antenna elements.

In block 1220, the first network node can determine first downlink transmission parameters, based on transmission or reception, using the configured second plurality of CSI ports. In some exemplary embodiments, determining first downlink transmission parameters can comprise transmitting first CSI reference signals (CSI-RS) using the configured second plurality of CSI ports, and receiving first downlink transmission parameters in response to the first CSI-RS transmissions.

In block 1230, a second network node can configure a third plurality of antenna elements as a fourth plurality of CSI ports based on the first data service type. In some exemplary embodiments, the quantity of the fourth plurality of CSI ports can be different than the quantity of the second plurality of antenna elements. In some exemplary embodiments of the present disclosure, the fourth plurality of CSI ports can be less than the third plurality of antenna elements. In some exemplary embodiments, each of the fourth plurality of CSI ports can be configured by virtualizing a portion of the third plurality of antenna elements. In some exemplary embodiments, each of the third plurality of antenna elements can be configured to provide a non-zero transmission power such that each of the fourth plurality of CSI ports produces a beam pattern substantially similar to a beam pattern produced by a particular one of the antenna elements.

In further exemplary embodiments, the fourth plurality of CSI ports can be equal to the third plurality of antenna elements.

In block 1240, the second network node can determine second downlink transmission parameters, based on transmission or reception, using the configured fourth plurality of CSI ports. In some exemplary embodiments, determining second downlink transmission parameters can comprise transmitting second CSI reference signals (CSI-RS) using the configured fourth plurality of CSI ports, and receiving second downlink transmission parameters in response to the second CSI-RS transmissions.

In block 1250, a controller can select, based on the first and second downlink transmission parameters, the first or second network node to provide first data service to the wireless communication device. In some exemplary embodiments, the controller can also select a precoding matrix for antenna elements associated with the selected network node, e.g., based on the downlink transmission parameters corresponding to the selected network node. In some exemplary embodiments, the selected network node can select the precoding matrix associated with its antenna elements.

Although FIG. 12 shows blocks 1210-1220 (first network node) and blocks 1230-1240 (second network node) in a side-by-side arrangement, this is only for convenience of illustration and is not intended to limit the relative order in which the two network nodes perform their respective operations. In other words, the two network nodes can perform the respective operations of blocks 1210-1220 and 1230-1240 concurrently, sequentially, or in any combination thereof.

Figure 13:
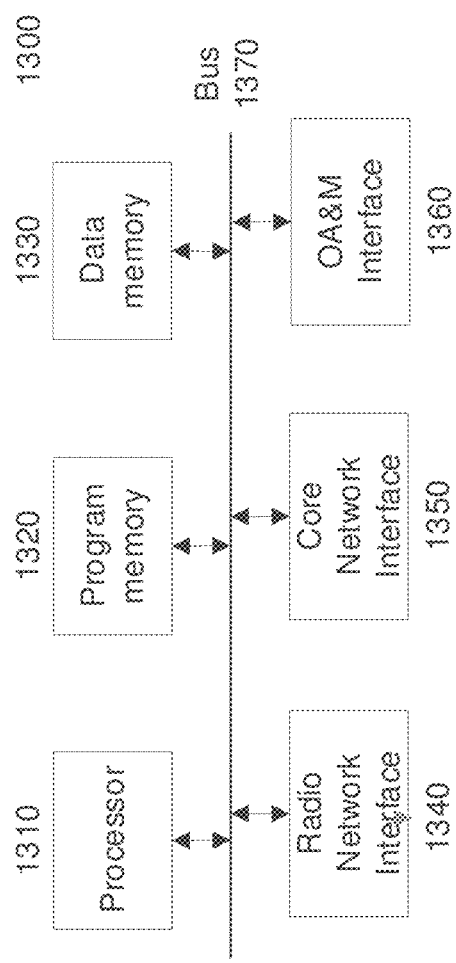
FIG. 13 is a block diagram of an exemplary wireless network apparatus (e.g., a base station, eNB, or gNB) according to one or more exemplary embodiments of the present disclosure.

Although various embodiments were described above in terms of exemplary methods and/or procedures, the person of ordinary skill will readily comprehend that such methods can be embodied by various combinations of hardware find software in various systems, communication devices, computing devices, control devices, apparatuses, network nodes, components, non-transitory computer-readable media, virtualized nodes and/or components, etc. FIG. 13 shows a block diagram of an exemplary apparatus 1300 utilizing certain embodiments of the present disclosure, including those described above with reference to other figures. In some exemplary embodiments, apparatus 1300 can comprise a network node such as abase station, eNB, gNB, or component thereof. Apparatus 1300 comprises processor 1310 which is operably connected to program memory 1320 and data memory 1330 via bus 1270, which can comprise parallel address and data buses, serial ports, or other methods and/or structures known to those of ordinary skill in the art. In some exemplary embodiments, processor 1310 can comprise some or all of the functionality of processor 500 shown in FIG. 5 and discussed in more detail above.

Program memory 1320 comprises software code (e.g., program instructions) executed by processor 1310 that can configure and/or facilitate apparatus 1300 to communicate with one or more other devices using protocols according to various embodiments of the present disclosure, including one or more exemplary methods and/or procedures discussed above. Program memory 1320 can also comprise software code executed by processor 1310 that can facilitate and specifically configure apparatus 1300 to communicate with one or more other devices using other protocols or protocol layers, such as one or more of the PHY, MAC, RLC, PDCP, and RRC layer protocols standardized by 3GPP, or any other higher-layer protocols utilized in conjunction with radio network interface 1340 and core network interface 1350. By way of example and without limitation, core network interface 1350 can comprise the S1 interface and radio network interface 1350 can comprise the Uu interface, as standardized by 3GPP. Program memory 1320 can further comprise software code executed by processor 1310 to control the functions of apparatus 1300, including configuring and controlling various components such as radio network interface 1340 and core network interface 1350.

Data memory 1330 can comprise memory area for processor 1310 to store variables used in protocols, configuration, control, and other functions of apparatus 1300. As such, program memory 1320 and data memory 1330 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1310 can comprise multiple individual processors (not shown), each of which implements a portion of the functionality described above. In such case, multiple individual processors may be commonly connected to program memory 1320 and data memory 1330 or individually connected to multiple individual program memories and/or data memories. More generally, persons of ordinary skill in the art will recognize that various protocols and other functions of apparatus 1300 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1340 can comprise transmitters, receivers, signal processors, ASICs, antennas, beamforming units, and other circuitry that enables apparatus 1300 to communicate with other equipment such as, in some embodiments, a plurality of compatible user equipment (UE). In some exemplary embodiments, radio network interface can comprise various protocols or protocol layers, such as the LTE PHY, MAC, RLC, PDCP, and RRC layer protocols standardized by 3GPP, improvements thereto such as described herein above, or any other higher-layer protocols utilized in conjunction with radio network interface 1340. According to further exemplary embodiments of the present disclosure, the radio network interface 1340 can comprise a PHY layer based on orthogonal frequency division multiplexing (OFDM) or orthogonal frequency division multiple access (OFDMA) technologies. For example, radio network interface can comprise one or more features described hereinabove with reference to other figures, e.g., the exemplary antenna arrays and array processing features of FIGS. 4 and 5.

Core network interface 1350 can comprise transmitters, receivers, and other circuitry that enables apparatus 1300 to communicate with other equipment in a core network such as, in some embodiments, circuit-switched (CS) and/or packet-switched Core (PS) networks. In some embodiments, core network interface 1350 can comprise the S1 interface standardized by 3GPP. In some exemplary embodiments, core network interface 1350 can comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1350 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1360 can comprise transmitters, receivers, and other circuitry that enables apparatus 1300 to communicate with external networks, computers, databases, and the like for purposes of operations, administration, and maintenance of apparatus 1300 or other network equipment operably connected thereto. Lower layers of OA&M interface 1360 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1340, core network interface 1350, and OA&M interface 1360 may be multiplexed together on a single physical interface, such as the examples listed above.

Figure 14:
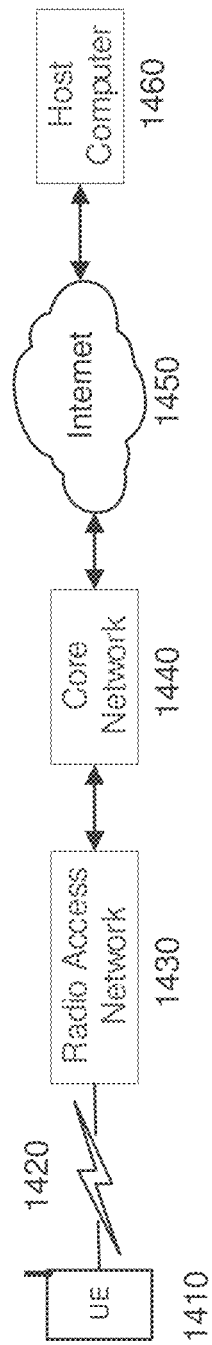
FIG. 14 is a block diagram of an exemplary network configuration usable to provide over-the-top (OTT) data services between a host computer and a user equipment, according to one or more exemplary embodiments of the present disclosure.

FIG. 14 is a block diagram of an exemplary network configuration usable to provide over-the-top (OTT) data services between a host computer and a user equipment (UE), according to one or more exemplary embodiments of the present disclosure. UE 1410 can communicate with radio access network (RAN) 1430 over radio interface 1420, which can be based on protocols described above including, e.g., LTE, LTE Advanced (LTE-A), and 5G NR. RAN 1430 can include one or more network nodes (e.g., base stations, eNBs, gNBs, controllers, etc.) that embody and/or incorporate apparatus 1300 shown in FIG. 13 and described above. RAN 1430 can further communicate with core network 1440 according to various protocols and interfaces described above. For example, one or more apparatus 1300 comprising RAN 1430 can communicate to core network 1440 via core network interface 1350 described above. In some exemplary embodiments, RAN 1430 and core network 1440 can be configured and/or arranged as shown in FIGS. 1 and 2 above.

Core network 1440 can further communicate with an external packet data network, illustrated in FIG. 14 as Internet 1450, according to various protocols and interfaces known to persons of ordinary skill in the art. Many other devices and/or networks can also connect to and communicate via Internet 1450, such as exemplary host computer 1460. In some exemplary embodiments, host computer 1460 can communicate with UE 1410 using Internet 1450, core network 1440, and RAN 1430 as intermediaries. Host computer 1460 can be a server (e.g., an application server) under ownership and/or control of a service provider. Host computer 1460 can be operated by the OTT service provider or by another entity on the service provider's behalf.

For example, host computer 1460 can provide an over-the-top (OTT) packet data service to UE 1410 using facilities of core network 1440 and RAN 1430, which can be unaware of the routing of an outgoing/incoming communication to/from host computer 1460. Similarly, host computer 1460 can be unaware of routing of a transmission from the host computer to the UE, e.g., the routing of the transmission through RAN 1430. Various OTT services can be provided using the exemplary configuration shown in FIG. 14 including, e.g., streaming (unidirectional) audio and/or video from host computer to UE, interactive (bidirectional) audio and/or video between host computer and UE, interactive messaging or social communication, interactive virtual or augmented reality, etc. Exemplary embodiments that adapt base station (e.g., eNB or gNB) antenna array characteristics depending on the data service type (e.g., URLLC and eMBB), as described hereinabove, can play a critical role by enabling RAN 1430 to meet the requirements of the particular OTT service between host computer 1460 and UE 1410. For example, adapting antenna arrays to provide narrow, high-gain beams, such as for eMBB, improves data throughput in a coverage area and enables a greater number of users to utilize data-intensive services such as streaming video. Similarly, adapting antenna arrays to provide broader but lower-gain beams, such as for URLLC, improves the latency and reliability needed to support highly interactive OTT services such as virtual or augmented reality.

The exemplary network shown in FIG. 14 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method for determining transmission parameters for downlink communication channels from one or more network nodes to one or more wireless communication devices, comprising:
    receiving information identifying a first data service type, of a plurality of available data service types, associated with a first wireless communication device;
    configuring a first plurality of antenna elements as a second plurality of channel state information (CSI) ports based on the first data service type, wherein the second plurality of CSI ports varies for the available data service types; and
    determining, based on transmission or reception using the second plurality of CSI ports, first downlink transmission parameters for the first data service type.

2. The method of claim 1, wherein the second plurality of CSI ports is less than the first plurality of antenna elements when configured for a particular data service type of the available data service types.

3. The method of claim 1, wherein determining first downlink transmission parameters comprises:
    transmitting first CSI reference signals (CSI-RS) to the first wireless communication device using the second plurality of CSI ports; and
    receiving, from the first wireless communication device, a CSI report comprising at least one of a rank indicator (RI), precoding matrix indicator (PMI), and a channel quality indicator (CQI).

4. The method of claim 3, further comprising configuring one of more parameters related to the first CSI-RS transmission in accordance with the second plurality of CSI ports.

5. The method of claim 1, wherein determining first downlink transmission parameters comprises:
    receiving an uplink transmission from the first wireless communication device using the second plurality of CSI ports; and
    determining first downlink transmission parameters based on the received uplink transmission and channel reciprocity information.

6. The method of claim 1, wherein for the particular data service type, each of the second plurality of CSI ports is configured by virtualizing a portion of the first plurality of antenna elements.

7. The method of any of claim 1, wherein each of the first plurality of antenna elements is configured to provide a non-zero transmission power such that each of the second plurality of CSI ports produces a beam pattern substantially similar to a beam pattern produced by a particular one of the first plurality of antenna elements.

8. The method of claim 1, further comprising
    receiving information identifying a second data service type associated with a second wireless communication device, wherein the second data service type is different than the first data service type;
    configuring a third plurality of antenna elements as a fourth plurality of CSI ports based on the second data service type, wherein the quantity of the fourth plurality of CSI ports is different than the quantity of the second plurality of CSI ports; and
    determining, based on transmission or reception using the fourth plurality of CSI ports, second downlink transmission parameters for the second data service type.

9. The method of claim 8, wherein the first and third plurality of antenna elements are associated with different network nodes.

10. The method of claim 8, wherein determining first and second downlink transmission parameters comprises:
- transmitting first and second CSI reference signals (CSI-RS) using, respectively, the second and fourth plurality of CSI ports, wherein the first and second CSI-RS transmissions are multiplexed in at least one of time and frequency; and
- receiving first and second downlink transmission parameters in response to the first and second CSI-RS transmissions.

11. The method of claim 1, further comprising:
- configuring a third plurality of antenna elements as a fourth plurality of CSI ports based on the first data service type, wherein the first plurality of antenna elements are associated with a first network node and the third plurality of antenna elements are associated with a second network node;
- determining second downlink transmission parameters based on transmission or reception using the fourth plurality of CSI ports; and
- based on the first and second downlink transmission parameters, selecting one of the first and second network nodes to provide the first data service to the wireless communication device.

12. A network node comprising:
- a radio interface;
- at least one processor; and
- at least one memory storing program instructions that, when executed by the at least one processor, configure the network node to:
  - receive information identifying a first data service type, of a plurality of available data service types, associated with a first wireless communication device;
  - configure a first plurality of antenna elements as a second plurality of Channel State Information (CSI) ports based on the first data service type, wherein the second plurality of CSI ports varies for the available data service types; and
  - determine, based on transmission or reception using the second plurality of CSI ports, first downlink transmission parameters for the first data service type.

13. The network node of claim 12, wherein the second plurality of CSI ports is less than the first plurality of antenna elements when configured for a particular data service type of the available data service types.

14. The network node of claim 12, wherein execution of the program instructions configure the network node to determine the first downlink transmission parameters by:
- transmitting first CSI reference signals (CSI-RS) to the first wireless communication device using the second plurality of CSI ports; and
- receiving, from the first wireless communication device, a CSI report comprising at least one of a rank indicator (RI), precoding matrix indicator (PMI), and a channel quality indicator (CQI).

15. The network node of claim 14, wherein execution of the program instructions further configure the network node to configure one or more parameters related to the first CSI-RS transmission in accordance with the second plurality of CSI ports.

16. The network node of claim 12, wherein execution of the program instructions configure the network node to determine the first downlink transmission parameters by:
- receiving an uplink transmission from the first wireless communication device using the second plurality of CSI ports; and
- determining first downlink transmission parameters based on the received uplink transmission and channel reciprocity information.

17. The network node of claim 12, wherein for the particular data service type, each of the second plurality of CSI ports is configured by virtualizing a portion of the first plurality of antenna elements.

18. The network node of claim 12, wherein each of the first plurality of antenna elements is configured to provide a non-zero transmission power such that each of the second plurality of CSI ports produces a beam pattern substantially similar to a beam pattern produced by a particular one of the first plurality of antenna elements.

19. The network node of claim 12, wherein execution of the program instructions configure the network node to:
- receive information identifying a second data service type associated with a second wireless communication device, wherein the second data service type is different than the first data service type;
- configure a third plurality of antenna elements as a fourth plurality of CSI ports based on the second data service type, wherein the quantity of the fourth plurality of CSI ports is different than the quantity of the second plurality of CSI ports; and
- determine, based on transmission or reception using the fourth plurality of CSI ports, second downlink transmission parameters for the second data service type.

20. The network node of claim 19, wherein the first and third plurality of antenna elements are associated with different network nodes.

21. The network node of claim 19, wherein execution of the program instructions configure the network node to determine the first and second downlink transmission parameters by:
- transmitting first and second CSI reference signals (CSI-RS) using, respectively, the second and fourth plurality of CSI ports, wherein the first and second CSI-RS transmissions are multiplexed in at least one of time and frequency; and
- receiving first and second downlink transmission parameters in response to the first and second CSI-RS transmissions.

22. A wireless network comprising:
- a first network node configured to:
  - configure a first plurality of antenna elements as a second plurality of Channel State Information (CSI) ports based on a first data service type; and
  - determine, based on transmission or reception using the second plurality of CSI ports, first downlink transmission parameters for the first data service type;
- a second network node configured to:
  - configure a third plurality of antenna elements as a fourth plurality of CSI ports based on the first data service type; and
  - determine second downlink transmission parameters based on transmission or reception using the fourth plurality of CSI ports; and
- a controller configured to:
  - select, based on the first and second downlink transmission parameters, one of the first and second network nodes to provide the first data service to a wireless communication device.

* * * * *